US008715400B2

(12) United States Patent
Haruna et al.

(10) Patent No.: US 8,715,400 B2
(45) Date of Patent: May 6, 2014

(54) DOUBLE VACUUM PUMP APPARATUS, GAS PURIFICATION SYSTEM PROVIDED WITH DOUBLE VACUUM PUMP APPARATUS, AND EXHAUST GAS VIBRATION SUPPRESSING DEVICE IN DOUBLE VACUUM PUMP APPARATUS

(75) Inventors: Kazuo Haruna, Osaka (JP); Kiyokazu Maruta, Osaka (JP); Hidenori Kuwata, Osaka (JP); Koichi Shima, Osaka (JP)

(73) Assignee: Sumitomo Seiko Chemicals Co., Ltd., Hyogo (JP)

( * ) Notice: Subject to any disclaimer, the term of this patent is extended or adjusted under 35 U.S.C. 154(b) by 197 days.

(21) Appl. No.: 13/518,257

(22) PCT Filed: Dec. 22, 2010

(86) PCT No.: PCT/JP2010/073091
§ 371 (c)(1),
(2), (4) Date: Jun. 21, 2012

(87) PCT Pub. No.: WO2011/078207
PCT Pub. Date: Jun. 30, 2011

(65) Prior Publication Data
US 2012/0255445 A1    Oct. 11, 2012

(30) Foreign Application Priority Data

Dec. 24, 2009 (JP) ................................. 2009-291796
Oct. 1, 2010 (JP) ................................. 2010-223841

(51) Int. Cl.
*B01D 53/02* (2006.01)
*F04B 41/06* (2006.01)
*F04B 37/14* (2006.01)
*F04B 37/16* (2006.01)
*B01D 53/04* (2006.01)
*B01D 53/047* (2006.01)

(52) U.S. Cl.
CPC ................. *F04B 41/06* (2013.01); *F04B 37/14* (2013.01); *F04B 37/16* (2013.01); *B01D 53/0446* (2013.01); *B01D 53/047* (2013.01); *B01D 53/0476* (2013.01); *B01D 2259/402* (2013.01)
USPC .................. 96/108; 418/5; 417/120; 417/148

(58) Field of Classification Search
CPC ............. B01D 53/0446; B01D 53/047; B01D 53/0476; B01D 2259/402; F04B 41/06; F04B 37/14; F04B 37/16
USPC .......................... 96/108; 418/5; 417/120, 148
See application file for complete search history.

(56) References Cited

U.S. PATENT DOCUMENTS 3,922,110 A * 11/1975 Huse ................................ 417/2
4,505,647 A * 3/1985 Alloca et al. ................. 417/252

(Continued)

FOREIGN PATENT DOCUMENTS

| JP | 6-254333 | 9/1994 |
| JP | 10-296034 | 11/1998 |

(Continued)

*Primary Examiner* — Christopher P Jones
(74) *Attorney, Agent, or Firm* — Hamre, Schumann, Mueller & Larson, P.C.

(57) ABSTRACT

A double vacuum pump apparatus (Y2) includes positive displacement vacuum pumps (40A, 40B) and lines (52, 60). Each of the vacuum pumps includes a suction port (41) and a discharge port (42), and a pressure detector (80) is provided in the vicinity of the suction port (41) of the double vacuum pump apparatus (Y2). The line (52) connects the discharge port (42) of the vacuum pump (40A) to the suction port (41) of the vacuum pump (40B). The line (60) has an end (E6) and an end (E5) that are connected to the connection line (52), and includes a buffer tube (Z1) and an on-off valve (61) located between the tube (Z1) and the end (E5). A pressure detection signal from the pressure detector (80) is used as an on/off signal for the on-off valve (61).

17 Claims, 20 Drawing Sheets

(56) References Cited

U.S. PATENT DOCUMENTS

| | | | |
|---|---|---|---|
| 4,850,806 A * | 7/1989 | Morgan et al. | 417/53 |
| 5,228,838 A * | 7/1993 | Gebele et al. | 417/53 |
| 5,259,735 A * | 11/1993 | Takahashi et al. | 417/203 |
| 5,595,477 A * | 1/1997 | Amlinger | 417/69 |
| 5,755,856 A * | 5/1998 | Miyake et al. | 95/101 |
| 6,004,109 A * | 12/1999 | Gebele et al. | 417/243 |
| 6,446,651 B1 * | 9/2002 | Abbel | 137/1 |
| 6,589,023 B2 * | 7/2003 | Royce et al. | 417/251 |
| 7,717,681 B2 * | 5/2010 | Bohm et al. | 417/248 |
| 7,758,317 B2 * | 7/2010 | Mukai et al. | 417/251 |
| 2005/0189074 A1 * | 9/2005 | Kasai et al. | 156/345.33 |
| 2007/0274822 A1 * | 11/2007 | Liu et al. | 415/90 |

FOREIGN PATENT DOCUMENTS

| | | |
|---|---|---|
| JP | 2001-212419 | 8/2001 |
| JP | 2006-272325 | 10/2006 |

* cited by examiner

FIG. 6

| | Step 1 | Step 2 | | Step 3 | Step 4 |
|---|---|---|---|---|---|
| Adsorption tower 10A | Adsorption step | | | Depressurization regeneration step | Pressure restoration step |
| Adsorption tower 10B | Depressurization regeneration step | Pressure restoration step | | Adsorption step | |

Relationship of suction port pressure of double vacuum pump with respect to apparent discharge amount and optimum power requirement Relationship of suction port pressure of double vacuum pump with respect to apparent discharge amount and optimum power requirement Relationship of suction port pressure of double vacuum pump with respect to apparent discharge amount and optimum power requirement

FIG. 16

| | Length of buffer tube | Minimum residence time within the buffer tube | Vibration acceleration of on-off valve shaft |
|---|---|---|---|
| Example 3 | 4.4 m | 0.50 sec | 3.0 G |
| Example 4 | 3.6 m | 0.41 sec | 3.1 G |
| Example 5 | 2.8 m | 0.32 sec | 3.1 G |
| Example 6 | 2.1 m | 0.24 sec | 3.2 G |
| Example 7 | 1.5 m | 0.17 sec | 4.5 G |
| Example 8 | 1.3 m | 0.15 sec | 5.5 G |
| Example 9 | 1.05 m | 0.12 sec | 7.0 G |
| Example 10 | 4.4 m | 0.50 sec | 2.1 G |
| Example 11 | 3.6 m | 0.41 sec | 2.0 G |
| Example 12 | 2.8 m | 0.32 sec | 2.1 G |
| Example 13 | 2.1 m | 0.24 sec | 2.1 G |
| Example 14 | 1.5 m | 0.17 sec | 2.5 G |
| Example 15 | 1.3 m | 0.15 sec | 3.0 G |
| Example 16 | 1.05 m | 0.12 sec | 4.5 G |

FIG. 19

| | Length of buffer tube | Minimum residence time within the buffer tube | Diameter of opening of orifice plate | Opening ratio | Vibration acceleration of on-off valve shaft |
|---|---|---|---|---|---|
| Example 17 | 1.3 m | 0.15 sec | 180 mm | 20% | 4.2 G |
| Example 18 | 1.3 m | 0.15 sec | 200 mm | 25% | 3.8 G |
| Example 19 | 1.3 m | 0.15 sec | 215 mm | 29% | 3.4 G |
| Example 20 | 1.3 m | 0.15 sec | 230 mm | 33% | 3.0 G |
| Example 21 | 1.3 m | 0.15 sec | 250 mm | 39% | 3.3 G |
| Example 22 | 1.3 m | 0.15 sec | 270 mm | 46% | 4.0 G |

DOUBLE VACUUM PUMP APPARATUS, GAS PURIFICATION SYSTEM PROVIDED WITH DOUBLE VACUUM PUMP APPARATUS, AND EXHAUST GAS VIBRATION SUPPRESSING DEVICE IN DOUBLE VACUUM PUMP APPARATUS

TECHNICAL FIELD

The present invention relates to an apparatus (double vacuum pump apparatus) including double vacuum pumps, and a gas purification system incorporating the same. Furthermore, the present invention also relates to an exhaust gas vibration suppressing device in the double vacuum pump apparatus.

BACKGROUND ART

Positive displacement vacuum pumps are used in various applications. For example, a double vacuum pump apparatus composed of two positive displacement vacuum pumps connected in series may be used to carry out pressure swing adsorption (PSA) as a gas purification method.

In the PSA, for example, an adsorption tower filled with an adsorbent for adsorbing impurities is used. In the gas purification by the PSA using such an adsorption tower, for example, the following cycle including an adsorption step and a depressurization regeneration step is repeated in the adsorption tower. In the adsorption step, a source gas, which is a mixed gas, is introduced into the adsorption tower whose interior is in the state of a relatively high pressure, and impurities contained in the source gas are adsorbed by the adsorbent while the non-adsorbed gas is emitted from the adsorption tower. The non-adsorbed gas is a gas enriched with a target gas, and is obtained as a purified gas. In the depressurization regeneration step, while the interior of the tower is depressurized to a relatively low pressure, impurities are desorbed from the adsorbent, and the desorbed gas containing the impurities is emitted to the outside of the tower. Positive displacement vacuum pumps may be used in order to depressurize the interior of the adsorption tower in this depressurization regeneration step.

Such positive displacement vacuum pumps are described, for example, in Patent Documents 1 and 2 below.
Patent Document 1: JP H10-296034A
Patent Document 2: JP 2006-272325A According to the disclosures in these publications, two positive displacement vacuum pumps (blowers) are connected either parallel to or in series with the adsorption tower according to variations of the load (the pressure in the adsorption tower) during the depressurization of the adsorption tower. For this reason, it is necessary to perform control to switch between the parallel connection and the serial connection, and the setting of the switching timing is not easy. Also, in these publications, no consideration is made as to what type of control needs to be performed to minimize the total power consumption of the two vacuum pumps in operating the two vacuum pumps. Furthermore, although flow vibration caused by the pulsation of exhaust gas of positive displacement vacuum pumps is involved, no consideration is also made as to how to avoid the adverse effect of the vibration on the on-off valve disposed downstream of the vacuum pumps in these publications.

DISCLOSURE OF INVENTION

Therefore, it is an object of the present invention to provide a double vacuum pump apparatus that can minimize the power requirement of two vacuum pumps.

Another object of the present invention is to provide a gas purification system including a double vacuum pump apparatus that can minimize the power requirement as described above.

A further object of the present invention is to provide an exhaust gas vibration suppressing device in the double vacuum pump apparatus.

According to a first aspect of the present invention, a double vacuum pump apparatus is provided. The double vacuum pump apparatus includes a first vacuum pump of a positive displacement-type including a suction port and a discharge port; a second vacuum pump including a suction port and a discharge port and having a discharge capacity smaller than the discharge capacity of the first vacuum pump; a connection line connecting between the discharge port of the first vacuum pump and the suction port of the second vacuum pump; a bypass line having a first end connected to the connection line and a second end for emitting gas to the outside; and an on-off valve disposed between the first end and the second end of the bypass line. The on-off valve is configured to be switched from an open state to a closed state when the discharge amount from the discharge port of the first vacuum pump has decreased to match the discharge capacity of the second vacuum pump.

At the time of using the double vacuum pump apparatus according to the first aspect of the present invention, the suction port of the first vacuum pump is linked to a container (container to be depressurized) whose interior needs to be depressurized to a predetermined pressure lower than the atmospheric pressure, for example, via a predetermined line. Examples of such container to be depressurized include an adsorption tower for performing the PSA and a vacuum chamber of a semiconductor manufacturing apparatus. Further, during the operation of the present pump apparatus, the first and second vacuum pumps that are connected in series via the connection line are operated. Of the discharge amount from the first vacuum pump or the discharge port thereof, a flow rate of gas exceeding the discharge amount from the second vacuum pump is excess gas for the second vacuum pump. If this is directly feed into the second vacuum pump, the second vacuum pump becomes overloaded, resulting in an increase in the overall power consumption of the double vacuum pump apparatus. Therefore, according to the first aspect of the present invention, the on-off valve of the bypass line is turned to the open state when the discharge amount from the first vacuum pump exceeds the discharge capacity of the second vacuum pump (i.e., when excess gas is present), thus controlling the gas flow in the present apparatus so as to cause the excess gas to flow into the bypass line from the connection line. When the discharge amount from the first vacuum pump does not exceed the discharge amount of the second vacuum pump (when excess gas is not present), the on-off valve of the bypass line is turned to the closed state so as to bring the two vacuum pumps into a completely serial state. As a result, the second vacuum pump will not become overloaded, and it is therefore possible to suppress the power consumption. In a state in which excess gas is generated, the excess gas flows into the bypass line from the connection line, then passes through the on-off valve within the bypass line, and thereafter is emitted from the second end. The second end of the bypass line is indirectly connected to the silencer, for example, through a piping extending from the discharge port via the second vacuum pump. On the other hand, in a state in which excess gas is not generated, the first and second vacuum pumps in a completely serial state depressurize, in cooperation with each other, the interior of the container to be depressurized; and a predetermined amount of gas is emitted from second vacuum pump. At this time, the on-off valve of the bypass line is in the closed state, and therefore no gas passes through bypass line.

Preferably, the double vacuum pump apparatus further includes a pressure detector that detects the pressure in the vicinity of the suction port of the first vacuum pump, and the on-off valve is configured to be switched from the open state to the closed state when the pressure detector has detected that the discharge amount from the discharge port of the first vacuum pump has decreased to a pressure value indicating that the discharge amount has matched the discharge capacity of the second vacuum pump. Alternatively, the on-off valve may be configured to be switched from the open state to the closed state when the pressure detector has detected a pressure value indicating that the pressure inside the connection line has decreased to the atmospheric pressure.

As the characteristics of the double vacuum pump apparatus according to the first aspect of the present invention, how the apparent discharge amount (the discharge amount that has not converted into normal conditions) and the power requirement change according to the suction port pressure of the first vacuum pump is predicted in advance in the form of a characteristic graph as shown in FIG. 8. This characteristic graph suggests an optimum point where only the first vacuum pump acts and excess gas for the second vacuum pump is discharged to the outside from the connection line through the on-off valve of the bypass line, and indicates that the suction port pressure decreases to −42 kPaG, for example, and at the same time, the pressure in the connection line drops to atmospheric pressure, as a result of which the excess gas for the second vacuum pump becomes zero and a minimum and optimum power requirement is provided for the double vacuum pump apparatus with which the first vacuum pump and the second vacuum pump can discharge exhaust gas in a serial manner in cooperation with each other.

The present inventors found that when the pressure in the connection line between the first vacuum pump and the second vacuum pump becomes equal to the atmospheric pressure, the corresponding pressure at the suction port of the first vacuum pump does not vary with the gas temperature. Specifically, they found that even if the gas temperature has changed and hence the gas adsorption amount has changed, for example, when the pressure at the suction port is −42 kPaG, the pressure in the connection line is atmospheric pressure and does not change with the gas temperature. As for a pressure of −92 kPaG, the bent point of the power requirement moves in the direction of −42 kPaG or less when the discharge amount of the first vacuum pump is increased in a combination of the first vacuum pump and the second vacuum pump, and moves in the direction of −42 kPaG or more when the discharge amount of the second vacuum pump is increased. Furthermore, regarding the effect of the gas temperature, the amount of gas adsorbed to the adsorbent decreases during the summer when the gas temperature increases (e.g., at 40° C.), and the pressure on the suction port side during the depressurization regeneration decreases and changes as shown in the curve on the lower-side curve in FIG. 7. On the other hand, during the winter when the gas temperature decreases (e.g., upon reaching 20° C.), the amount of gas adsorbed to the adsorbent increases, so that the pressure at the suction port side during the depressurization regeneration increases and changes as shown in the upper-side curve in FIG. 7. However, in the case where the double vacuum pump apparatus uses roots pumps, which are of positive displacement type, the apparent discharge amount will not change because it will not be affected by the change of the gas adsorption capacity resulting from the gas temperature change due to seasonal variations.

In a preferred embodiment of the present invention, the on-off valve is configured to be switched from the open state to the closed state when the pressure detector has detected a pressure value indicating that the discharge amount from the discharge port of the first vacuum pump has matched the discharge amount from the second vacuum pump. This configuration helps efficiently operating the double vacuum pump apparatus. If the on-off valve is closed before the pressure in the connection line has decreased to the atmospheric pressure, the power requirement of the second vacuum pump increases as shown in FIG. 19. If the on-off valve is left in the open-state in a state in which the above-described pressure has been reduced to atmospheric pressure or less, the power requirement of the first vacuum pump increases as shown in FIG. 15. Accordingly, it is possible to determine accurate switching timing by predicting the point at which the pressure in the connection line decreases to the atmospheric pressure, detecting the pressure value on the suction port side of the first vacuum pump by the detector, and closing the on-off valve of the bypass line using the resulting signal.

Preferably, each of the first and second vacuum pumps is a roots pump including a casing and a rotor within the casing, and the rotor of the first vacuum pump and the rotor of the second vacuum pump are configured to be rotationally driven in conjunction with each other by a single motor. This configuration is suitable in reducing the power requirement of the present double vacuum pump apparatus.

Preferably, the bypass line includes a buffer tube between the first end and the on-off valve tube for suppressing flow vibration of gas flowing into the bypass line.

Preferably, the buffer tube is configured such that, in the case where the on-off valve is in the open state, a minimum residence time within the buffer tube of gas passing therethrough is 0.15 second or more when the discharge amount from the discharge port of the first vacuum pump exceeds the discharge capacity of the second vacuum pump.

Preferably, the buffer tube includes a constricted portion for locally narrowing the flow path of gas passing through the interior thereof, and the constricted portion has an opening ratio of 20 to 46%.

Preferably, the buffer tube includes a plurality of constricted portions for locally narrowing the flow path of gas passing through the interior thereof, and the plurality of constricted portions include a first constricted portion located most upstream in the flow path and a second constricted portion located most downstream.

Preferably, the constricted portion is an orifice plate having an opening, or a baffle plate.

Preferably, the constricted portion is an orifice plate having an opening, and a portion of an edge of the opening is flush with an inner wall surface of the buffer tube.

Preferably, the buffer tube is configured such that, in the case where the on-off valve is in the open state, a maximum flow velocity within the buffer tube of gas passing therethrough is 6 to 12 m/sec when the amount of gas discharged from the discharge port of the first vacuum pump exceeds the suction capacity of the second vacuum pump.

According to a preferred embodiment, the buffer tube includes a first end wall on the first end side in the bypass line, a second end wall on the second end side, and a surrounding wall extending between the first and second end walls. The bypass line includes a connecting tube portion connected to the buffer tube at a location of the surrounding wall on the first end wall side for introducing gas to the buffer tube, and the connecting tube portion extends in a direction intersecting with the extending direction of the surrounding wall.

According to another preferred embodiment, the buffer tube includes a first end wall on the first end side in the bypass line, a second end wall on the second end side, and a surrounding wall extending between the first and second end walls. The bypass line includes a connecting tube portion connected to the buffer tube at the first end wall for introducing gas to the buffer tube, and the connecting tube portion has a bent structure for bending the flow of gas immediately before the gas is introduced into the buffer tube.

According to a second aspect of the present invention, a gas purification system is provided. The gas purification system includes an adsorption tower whose interior is filled with an adsorbent for purifying gas using pressure swing adsorption (PSA), and a double vacuum pump apparatus according to the first aspect of the present invention for depressurizing the interior of the adsorption tower.

According to a third aspect of the present invention, there is provided an exhaust gas vibration suppressing device including: a first vacuum pump of a positive displacement-type including a suction port and a discharge port; a second vacuum pump including a suction port and a discharge port and having a discharge capacity smaller than the discharge capacity of the first vacuum pump; a connection line connecting between the discharge port of the first vacuum pump and the suction port of the second vacuum pump; a bypass line having a first end connected to the connection line and a second end for emitting gas to the outside; and an on-off valve disposed between the first end and the second end of the bypass line. In the exhaust gas vibration suppressing device, a buffer tube for suppressing flow vibration of gas flowing into the bypass line is provided between the first end and the on-off valve.

BRIEF DESCRIPTION OF DRAWINGS

FIG. 6 is a process table showing a cycle (Steps 1 to 4) in a gas purification method that can be performed with the gas purification system shown in FIG. 1.

FIG. 16 is a table summarizing the results of measurement for Examples 3 to 16.

FIG. 19 is a table summarizing the results of measurement for Examples 17 to 22.

DESCRIPTION OF EMBODIMENTS

Figure 1:
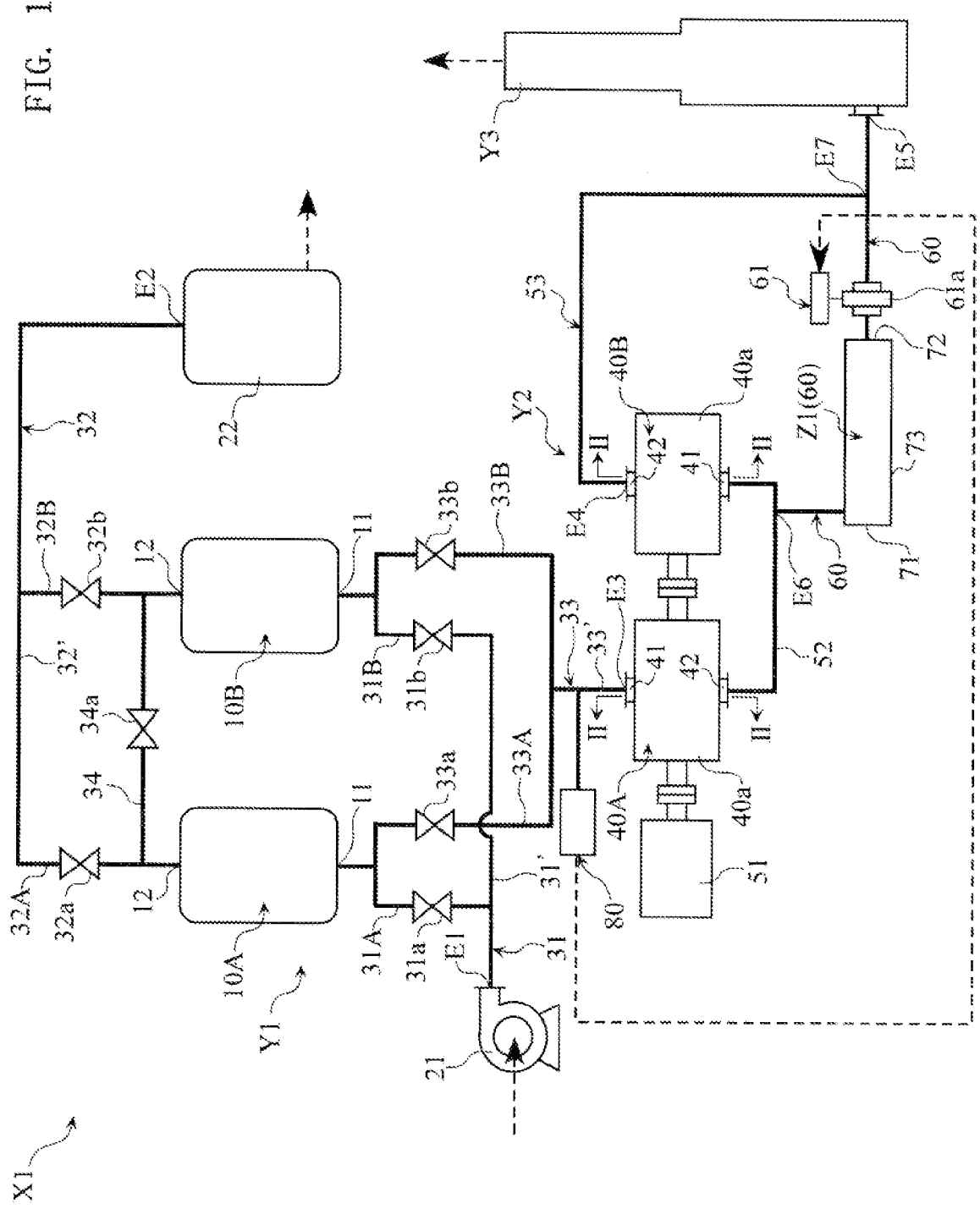
FIG. 1 is a diagram showing a schematic configuration of a gas purification system according to an embodiment of the present invention.

FIG. 1 shows a schematic configuration of a gas purification system X1 according to an embodiment of the present invention. The gas purification system X1 includes a PSA apparatus Y1, a double vacuum pump apparatus Y2, and a silencer Y3.

The PSA apparatus Y1 includes adsorption towers 10A and 10B, a source blower 21, a tank 22, and pipings 31 to 34, and is configured to remove impurities by adsorption from a source gas, which is mixed gas, using pressure swing adsorption (PSA), thereby concentrating and separating a gas component of interest. The gas component of interest that is to be purified in this embodiment is oxygen contained in air. In this case, nitrogen is the major impurity.

Each of the adsorption towers 10A and 10B has gas passage apertures 11 and 12 at opposite ends, and an adsorbent for selectively adsorbing impurities contained in the source gas is filled in the space between the gas passage apertures 11 and 12. In this embodiment, a zeolite-based adsorbent for selectively adsorbing nitrogen, which is the major impurity, is used as the adsorbent. In the case of using molecular sieve carbon as the adsorbent, however, it is possible to adsorb oxygen contained in air as the impurity and recover nitrogen as the gas component of interest. Further, it is also possible to recover carbon dioxide, carbon monoxide, hydrogen, methane, and the like as the gas component of interest by selecting the combination of the source gas composition and the adsorbent.

In this embodiment, the source blower 21 is an air blower, which is used to supply or feed, to the adsorption towers 10A and 10B, the air that has been sucked as the source gas. The tank 22 is used to temporarily store the purified gas (in this embodiment, oxygen).

The piping 31 includes a main path 31' and branched paths 31A and 31B. The main path 31' has an end E1. The end E1 is connected to a gas feeding port of the source blower 21. The branched paths 31A and 31B are connected to the gas passage apertures 11 side of the adsorption towers 10A and 10B, respectively. Also, the branched paths 31A and 31B are provided with automatic valves 31a and 31b that can be switched between the open state and the closed state.

The piping 32 includes a main path 32' and branched paths 32A and 32B. The main path 32' has an end E2. The end E2 is connected to the tank 22. The branched paths 32A, 32B are connected to the gas passage aperture 12 side of the adsorption towers 10A and 10B, respectively. Also, the branched paths 32A, 32B are provided with automatic valves 32a and 32b that can be switched between the open state and the closed state.

The piping 33 includes a main path 33' and branched paths 33A and 33B. The main path 33' has an end E3. The end E3 is connected to the double vacuum pump apparatus Y2. The branched paths 33A and 33B are connected to the gas passage aperture 11 side of the adsorption towers 10A and 10B, respectively. Also, the branched paths 33A and 33B are provided with automatic valves 33a and 33b that can be switched between the open state and the closed state. A pressure detector 80 is installed in the vicinity of the end E3 of the main path 33', and the pressure detector 80 constantly detects the pressure at a suction port 41 of the vacuum pump 40A. By monitoring the pressure value (inlet pressure value) detected by the pressure detector 80, the pressure (outlet pressure value) inside the connection line 52 connecting to an discharge port 42 of the vacuum pump 40A is predicted indirectly, and a signal is sent when the inlet pressure value has reached a predetermined threshold (set pressure value) so as to open or close the on-off valve 61. The predetermined threshold of the inlet pressure value may be set, for example, to a value at which the above-described outlet pressure value (the pressure inside the connection line 52) becomes equal to atmospheric pressure.

The piping 34 is provided so as to bridge the branched paths 32A and 32B of the piping 32. Specifically, the piping 34 is connected to the branched path 32A between the automatic valve 32a and the adsorption tower 10A, and is also connected to the branched path 32B between the automatic valve 32b and the adsorption tower 10B. Also, the piping 34 is provided with an automatic valve 34a that can be switched between the open state and the closed state.

The double vacuum pump apparatus Y2 includes two vacuum pumps 40A and 40B, a motor 51, a connection line 52, a piping 53, and a bypass line 60, and is configured to be able to depressurize the interior of the adsorption towers 10A and 10B of the above-described PSA apparatus Y1 by operation of the vacuum pumps 40A and 40B.

The vacuum pump 40A is a positive displacement vacuum pump, which is a roots pump in this embodiment. The vacuum pump 40B is also a roots pump in this embodiment. The discharge capacity (which refers to the maximum amount of gas that can be discharged per unit time, the same as "suction capacity") of the vacuum pump 40B is smaller than that of the vacuum pump 40A. The vacuum pumps 40A and 40B each have a suction port 41 and a discharge port 42. The end E3 of the piping 33 in the above-described PSA apparatus Y1 is connected to the suction port 41 of the vacuum pump 40A.

Figure 2:
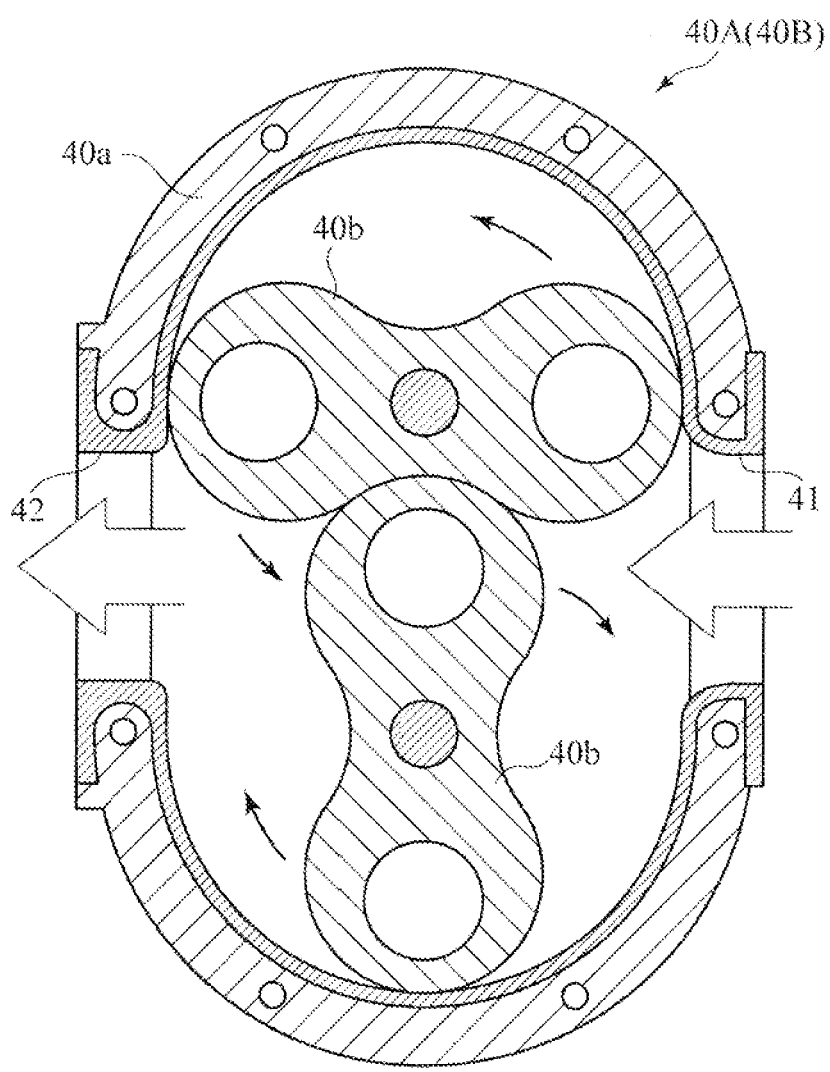
FIG. 2 is a cross-sectional view of a roots pump taken along the arrows II-II in FIG. 1.

The roots pump includes, for example, as shown in FIG. 2, a casing 40a, and two rotors 40b having, for example, a cocoon shape, within the casing 40a. The two rotors 40b are configured to synchronously rotate in directions opposite to each other. At the time of driving such a roots pump, the gas that has entered the casing 40a from the suction port 41 is trapped in the space between the casing 40a and the rotor 40b, and is discharged to the discharge port 42 side by rotation of the rotors 40b. Further, in this embodiment, sealing water supply means (not shown) for supplying the so-called sealing water into the respective casings 40a of the vacuum pumps 40A and 40B is provided in the double vacuum pump apparatus Y2. With the sealing water, it is possible to achieve high air-tightness for the space formed between the casing 40a and the rotor 40b.

The motor 51 is used to operate the vacuum pumps 40A and 40B. The double vacuum pump apparatus Y2 is configured such that the rotor of the vacuum pump 40A and the rotor of the vacuum pump 40B are rotationally driven in conjunction with each other by a single motor 51. Specifically, a mechanical interlock is provided between the motor 51 and the vacuum pumps 40A and 40B via shaft components, gear components, and the like such that the rotor of the vacuum pump 40A and the rotor of the vacuum pump 40B are rotated in conjunction with each other by the single motor 51.

The connection line 52 connects between the discharge port 42 of the vacuum pump 40A and the suction port 41 of the vacuum pump 40B. The piping 53 has ends E4 and E5. The end E4 of the piping 53 is connected to the discharge port 42 of the vacuum pump 40B. The other end E5 of the piping 53 is connected to the silencer Y3.

The bypass line 60 has an end E6 serving as the line inlet and an end E7 serving as the line outlet, and has an on-off valve 61 and a buffer tube Z1 within the line. The end E6 is connected to the connection line 52 between the vacuum pumps 40A and 40B. The end E7 is connected to the piping 53. The on-off valve 61 is located between the buffer tube Z1 and the end E5 in the bypass line 60, and, in this embodiment, is open/closed when a pressure set value of the pressure detector 80 is reached. During the operation of the double vacuum pump apparatus Y2, there is a period in which the on-off valve 61 is in the open state to allow passage of gas through the bypass line 60. The on-off valve 61 is configured to detect the pressure at the suction port 41 (the pressure is specified by a preliminarily conducted test) when the discharge amount (the amount of the gas actually discharged per unit time) from the discharge port 42 of the vacuum pump 40A gradually decreases to match the discharge capacity of the vacuum pump 40B, and to be switched from the open state to the closed state. This control is necessary because the vacuum pump 40B is designed to have a smaller discharge capacity than that of the vacuum pump 40A as described above.

Figure 3:
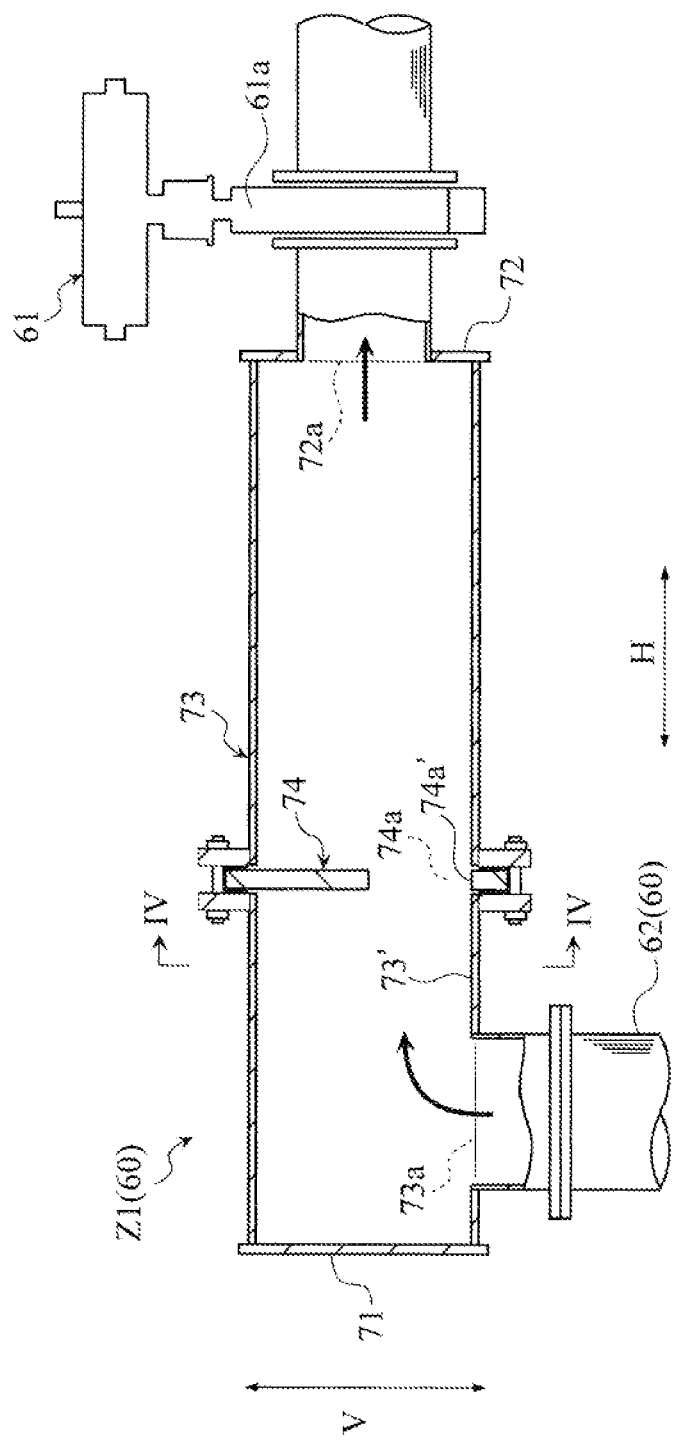
FIG. 3 is an enlarged partial cross-sectional view showing a buffer tube and the vicinity thereof shown in FIG. 1.

As shown in FIG. 1 or 3, the buffer tube Z1 constitutes a part of the bypass line 60, and includes an end wall 71 on the end E6 side of the bypass line 60, an the end wall 72 on the end E7 side, a surrounding wall 73 extending between the end walls 71 and 72, and orifice plate 74. In this embodiment, the surrounding wall 73 has a cylindrical shape. A gas inlet 73a is provided at a location of the surrounding wall 73 on the end wall 71 side, and a gas outlet 72a is provided in the end wall 72. Preferably, the surrounding wall 73 extends in the horizontal direction H. The length of the surrounding wall 73 (i.e., the buffer tube Z1) in the extending direction is 1 m or more, for example. Also, the bypass line 60 includes a connecting tube portion 62 connected to the buffer tube Z1 at the gas inlet 73a provided on the surrounding wall 73. The connecting tube portion 62 constitutes a part of the bypass line 60 immediately upstream from the buffer tube Z1 and defines a flow path of gas immediately before the gas is introduced into the buffer tube Z1. In this embodiment, the connecting tube portion 62 extends in a direction intersecting with the extending direction of the surrounding wall 73 (the horizontal direction H). Preferably, the connecting tube portion 62 extends in a direction orthogonal to the extending direction of the surrounding wall 73. More preferably, the connecting tube portion 62 extends in the direction V and is connected to the surrounding wall 73 of the buffer tube Z1 from below in the vertical direction V.

Figure 4:
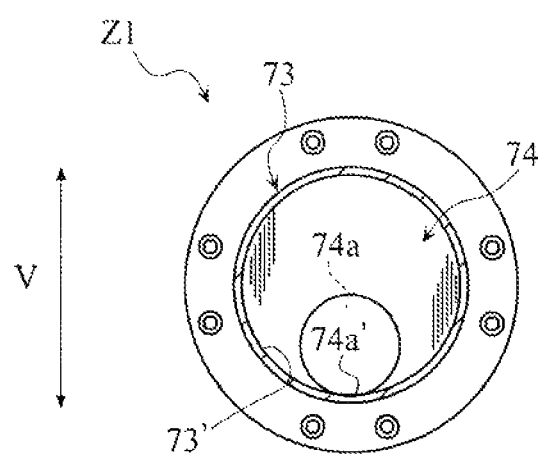
FIG. 4 is a cross-sectional view taken along the arrows IV-IV in FIG. 3.

The orifice plate 74 is a constricted portion for locally narrowing the flow path of the gas passing through the interior of the buffer tube Z1, and has an opening 74a as shown in FIGS. 3 and 4. The opening ratio of the orifice plate 74 (constricted portion) is preferably 20 to 46%, more preferably 29 to 39%. The opening 74a has an edge 74a' that is flush with an inner surface 73' of the surrounding wall 73 of the buffer tube Z1. That is, the rotationally symmetrical axis of the cylindrical buffer tube Z1 and the center of the opening 74a are shifted in position, and the inner surface 73' of the surrounding wall 73 is flush with a distal end 74a' of the edge of the opening 74a.

During the operation of the double vacuum pump apparatus Y2, there is a period in which the on-off valve 61 is in the open state to allow passage of gas through the bypass line 60. The buffer tube Z1 is configured such that in the case where the on-off valve 61 of the bypass line 60 is in the open state, the minimum residence time in the buffer tube of the gas passing through the buffer tube Z1 is 0.15 second or more when the discharge amount from the discharge port 42 of the vacuum pump 40A exceeds the discharge capacity (the same as the suction capacity) of the vacuum pump 40B. As described above, this state occurs because the discharge capacity of the vacuum pump 40B is smaller than that of the vacuum pump 40A. Preferably, the buffer tube Z1 is also configured such that in the case where the on-off valve 61 of the bypass line 60 is in the open state during the operation of the double vacuum pump apparatus Y2, the maximum flow velocity within the buffer tube of the gas passing through the buffer tube Z1 is 6 to 12 m/sec when the discharge amount from the discharge port 42 of the vacuum pump 40A exceeds the discharge capacity of the vacuum pump 40B.

Figure 5:
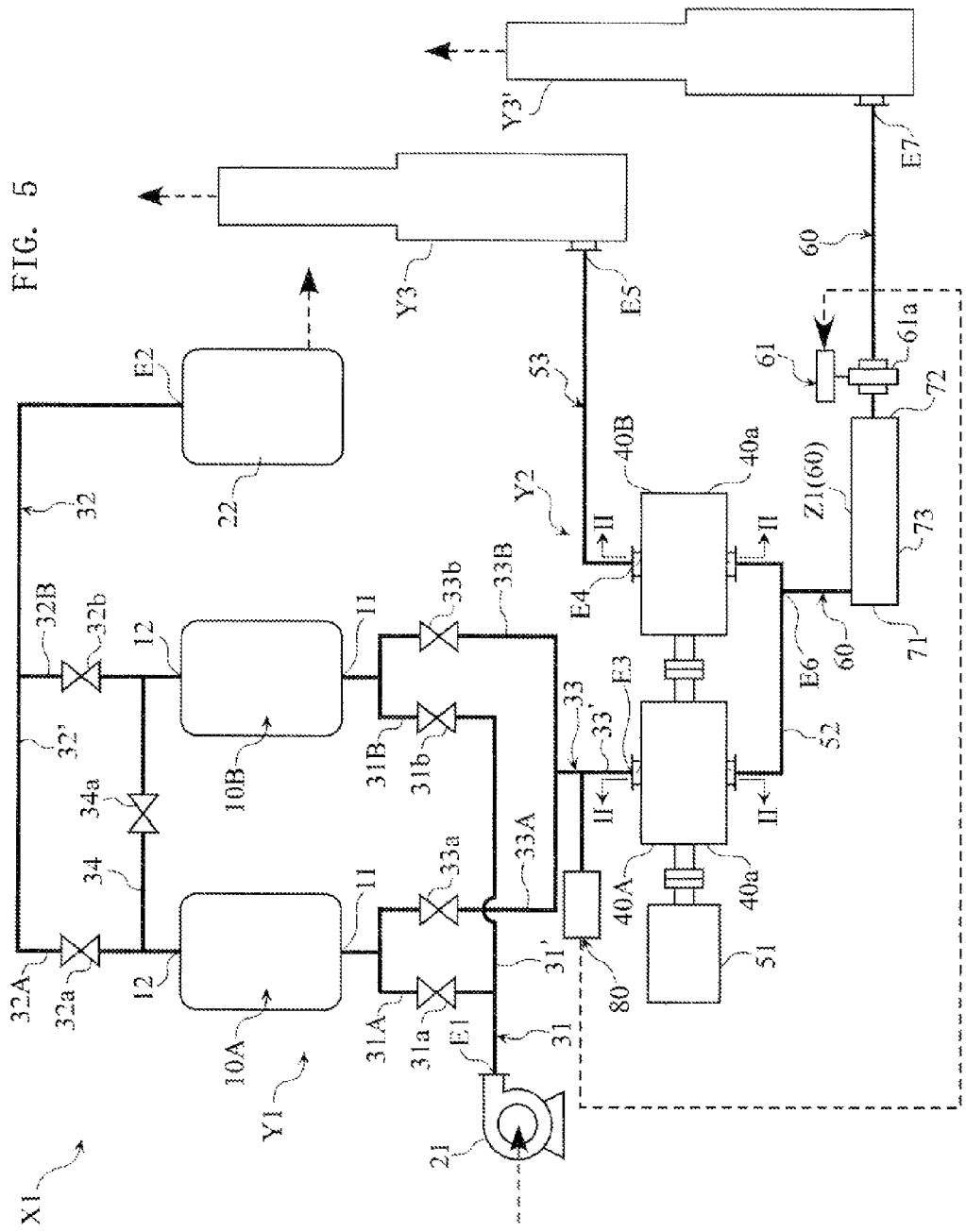
FIG. 5 is a diagram showing a schematic configuration of a modification of the gas purification system shown in FIG. 1.

The silencer Y3 is a device for reducing the noise emitted during the discharge of gas discharged from the gas purification system X1. Therefore, if the noise is not a problem, the silencer Y3 may be omitted and the piping 53 and the bypass line 60 may be directly open to the atmosphere. Furthermore, although, in the embodiment shown in FIG. 1, the bypass line 60 is merged with the piping 53 and connected to the same silencer Y3, the piping 53 and the bypass line 60 may be connected to separate silencers Y3 and Y3', respectively, as shown in FIG. 5.

Using the gas purification system X1 (including the PSA apparatus Y1 and the double vacuum pump apparatus Y2) having the above-described configuration, it is possible to purify a target gas (in this embodiment, oxygen) from a source gas (in this embodiment, air). Specifically, during the operation of the PSA apparatus Y1 and the double vacuum pump apparatus Y2, it is possible to achieve the desired gas flow state within the system by switching between the open state and closed state of the automatic valves 31a, 31b, 32a, 32b, 33a, 33b, and 34a of the PSA apparatus Y1 at a predetermined timing, and to repeat a cycle including the following Steps 1 to 4 in the adsorption towers 10A and 10B of the PSA apparatus Y1, thus obtaining a purified oxygen gas. In a cycle (Steps 1 to 4), an adsorption step, a depressurization regeneration step, and a pressure restoration step are performed in each of the adsorption towers 10A and 10B as shown in FIG. 6.

In Step 1, the adsorption step is performed in the adsorption tower 10A, and the depressurization regeneration step is performed in the adsorption tower 10B. The interior of the adsorption tower 10A, in which the adsorption step is performed in Step 1, is in the state of a relatively high pressure (e.g., about 40 kPaG, which is slightly higher than atmospheric pressure: G represents the gauge pressure; the same applies in the following) after undergoing Step 4 (the pressure restoration step is performed in the adsorption tower 10A), which will be described below. Then, in Step 1, air is continuously introduced into the gas passage apertures 11 side of the adsorption tower 10A from the source blower 21 via the main path 31' and the branched path 31A of the piping 31, and mainly nitrogen contained in the air is adsorbed by the adsorbent in the adsorption tower 10A, and an oxygen-enriched purified oxygen gas is continuously emitted from the gas passage aperture 12 side of the adsorption tower 10A. The purified oxygen gas is guided through the branched path 32A and the main path 32' of the piping 32 to the tank 22, and stored in the tank 22. This purified oxygen gas may be continuously supplied from the tank 22 to a predetermined apparatus or plant.

Along with this, in Step 1, the interior of the adsorption tower 10B that has undergone Steps 3 to 4 (the adsorption step is performed in the adsorption tower 10B), which will be described below, is depressurized by the double vacuum pump apparatus Y2. Specifically, the gas passage aperture 11 side of the adsorption tower 10B and the suction port 41 side of the vacuum pump 40A of the double vacuum pump apparatus Y2 are in a state of communication via the piping 33, and then the interior of the adsorption tower 10B is depressurized by the double vacuum pump apparatus Y2. Thereby, mainly nitrogen is desorbed from the adsorbent in the adsorption tower 10B and is emitted to the outside of the tower. The nitrogen (off gas) is guided to the double vacuum pump apparatus Y2 from the gas passage aperture 11 side of the adsorption tower 10B via the branched path 33B and the main path 33' in the piping 33. As a result of desorption of nitrogen from the adsorbent in the adsorption tower 10B, the adsorbent is regenerated. The internal pressure of the adsorption tower 10B at the start of this depressurization regeneration step is about 40 kPaG, for example. The internal pressure of the adsorption tower 10B that is finally reached at the end of the depressurization regeneration step varies depending on the gas temperature, and may be, for example, −66 to −72 kPaG.

In Step 2, the adsorption step is performed in the adsorption tower 10A continuously from Step 1, and the pressure restoration step is performed in the adsorption tower 10B. In Step 2, specifically, continuously from Step 1, air is continuously supplied to the gas passage aperture 11 side of the adsorption tower 10A from the source blower 21, and the purified oxygen gas is continuously emitted from the gas passage aperture 12 side of the adsorption tower 10A. A part of the purified oxygen gas is introduced and stored in the tank 22. Another part of the purified gas is guided via the piping 34 to the gas passage aperture 12 side of the adsorption tower 10B. In Step 2, the purified oxygen gas is introduced from the gas passage aperture 12 side of the adsorption tower 10B side, and thereby, the internal pressure of the adsorption tower 10B is restored. That is, the interior of the adsorption tower 10B is returned to the state of a relatively high pressure (e.g., a pressure ranging from atmospheric pressure to about 40 kPaG).

In Steps 3 to 4, the adsorption step is performed in the adsorption tower 10B in the same manner as in the adsorption tower 10A in Steps 1 to 2. Accordingly, in Steps 1 to 2, the purified oxygen gas is continuously emitted from the gas passage aperture 12 side of the adsorption tower 10B, and the purified oxygen gas is introduced and stored in the tank 22. Along with this, in Steps 3 to 4, the depressurization regeneration step (Step 3) and the pressure restoration step (step 4) are performed in the adsorption tower 10A in the same manner as in the adsorption tower 10B in Steps 1 to 2. In the depressurization regeneration step in the adsorption tower 10A in Step 3, the gas passage aperture 11 side of the adsorption tower 10A and the suction port 41 side of the vacuum pump 40A of the double vacuum pump apparatus Y2 are in a state of communication via the piping 33, and then the interior of the adsorption tower 10A is depressurized by the double vacuum pump apparatus Y2. Thereby, mainly nitrogen is desorbed from the adsorbent in the adsorption tower 10A, and is emitted to the outside of the tower, and the nitrogen (off gas) is guided to the double vacuum pump apparatus Y2 from the gas passage aperture 11 side of the adsorption tower 10A via the branched path 33A and the main path 33' in the piping 33. As a result of desorption of nitrogen from the adsorbent in the adsorption tower 10A, the adsorbent is regenerated.

In the manner described above, the purified oxygen gas can be continuously obtained from the gas purification system X1, using the air as the source material. The double vacuum pump apparatus Y2 is operated in the gas purification system X1 specifically in the following manner.

In the above-described Step 1 (the depressurization regeneration step is performed in the adsorption tower 10B), the gas passage aperture 11 side of the adsorption tower 10B of the PSA apparatus Y1 and the suction port 41 side of the vacuum pump 40A of the double vacuum pump apparatus Y2 are in a state of communication via the piping 33, and the vacuum pumps 40A and 40B (which are connected in series via the connection line 52, is driven by the motor 51), and thereby, the interior of the adsorption tower 10B is depressurized. The on-off valve 61 of the bypass line 60 in the double vacuum pump apparatus Y2 is open. At the start of this Step 1 (the depressurization regeneration step), the internal pressure of the piping 33 in the vicinity of the suction port 41 is slightly higher than the atmospheric pressure (because the absorption pressure in the adsorption tower B is, for example, 40 kPaG), and the interior of the connection line 52 (the side that is subjected to pressurization by the vacuum pump 40A) is also at a pressure greater than the atmospheric pressure. Accordingly, immediately after the start of the depressurization regeneration step in the adsorption tower 10B of the PSA apparatus Y1, the off gas from the adsorption tower 10B passes through the vacuum pump 40A in the double vacuum pump apparatus Y2, and then a portion thereof passes through the vacuum pump 40B, whereas as a portion thereof passes through the bypass line 60 and is discharged to the outside through the silencer Y3.

Also, the discharge amount from the vacuum pump 40A that continues to suck the off gas from the adsorption tower 10B undergoing Step 1 (in which the depressurization regeneration step is performed), changes according to the pressure on the suction port 41 side of the vacuum pump 40A connected to the adsorption tower 10B (i.e., the inlet pressure of the double vacuum pump apparatus Y2). Specifically, the internal pressure of the adsorption tower 10B decreases (hence, the pressure on the suction port 41 side of the vacuum pump 40A also decreases) as the depressurization regeneration step proceeds, and the discharge amount of the vacuum pump 40A decreases accordingly.

Figure 7:
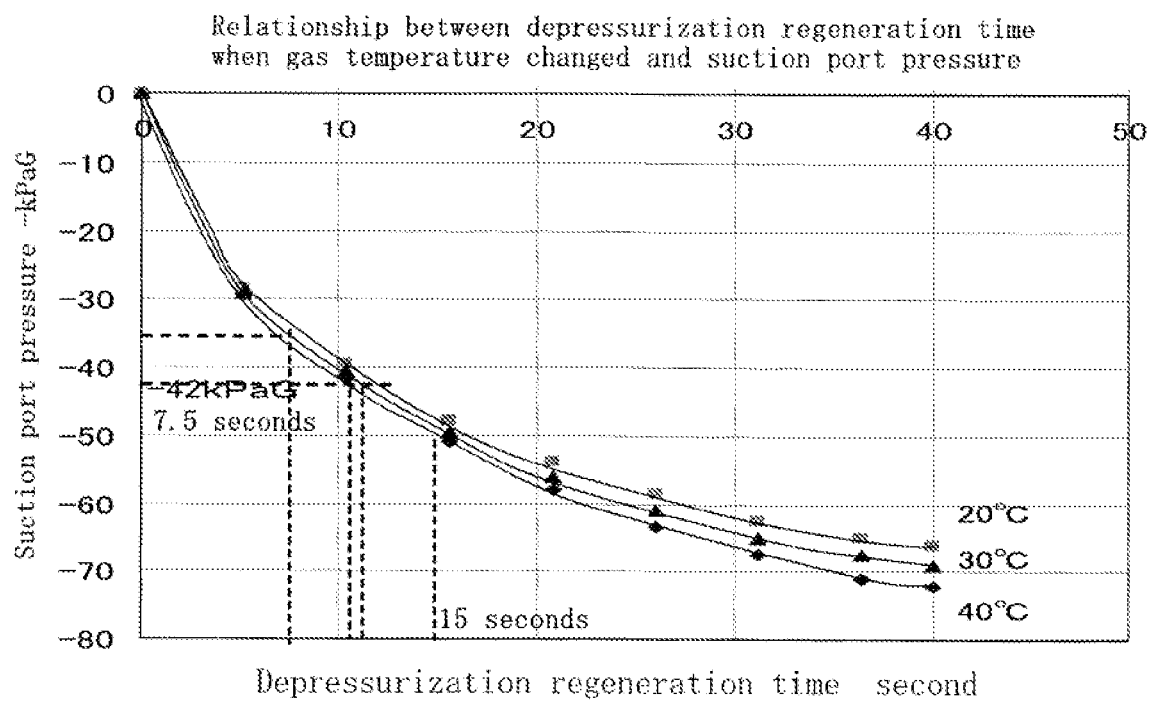
FIG. 7 is a graph showing the relationship between the depressurization regeneration time and the suction port pressure when the gas temperature has changed.

Of this discharge amount from the vacuum pump 40A that continues to suck the off gas from the adsorption tower 10B undergoing Step 1, a flow rate of gas exceeding the discharge amount from the vacuum pump 40B is excess gas for the vacuum pump 40B (as described above, the discharge capacity of the vacuum pump 40B is smaller than that of the vacuum pump 40A). The excess gas for the vacuum pump 40B is present for a certain period from the start of the depressurization regeneration step (Step 1) for the adsorption tower 10B. When the internal pressure of the adsorption tower 10B decreases in the depressurization regeneration step, the pressure of the vacuum pump 40A on the suction port 41 side decreases in the same manner. The discharge amount from the vacuum pump 40A decreases accordingly until it matches the discharge capacity (the same as the suction capacity) of the vacuum pump 40B. After this matching is achieved, the on-off valve 61 turns into the closed state, and therefore, the discharge amount from the vacuum pump 40B continues to decrease while it remains matching the discharge amount from the vacuum pump 40B. The change in pressure on the suction port 41 side of the vacuum pump 40A in the depressurization regeneration step according to the gas temperature is as shown in FIG. 7. That is, since the gas adsorption amount of the adsorbent decreases as the gas temperature increases, the pressure at the suction port 41 (the inlet of the double vacuum pump apparatus Y2) of the first vacuum pump 40A quickly drops in the depressurization regeneration time, and the pressure drop becomes slow when the gas temperature becomes low because the gas adsorption amount of the adsorbent increases.

Figure 8:
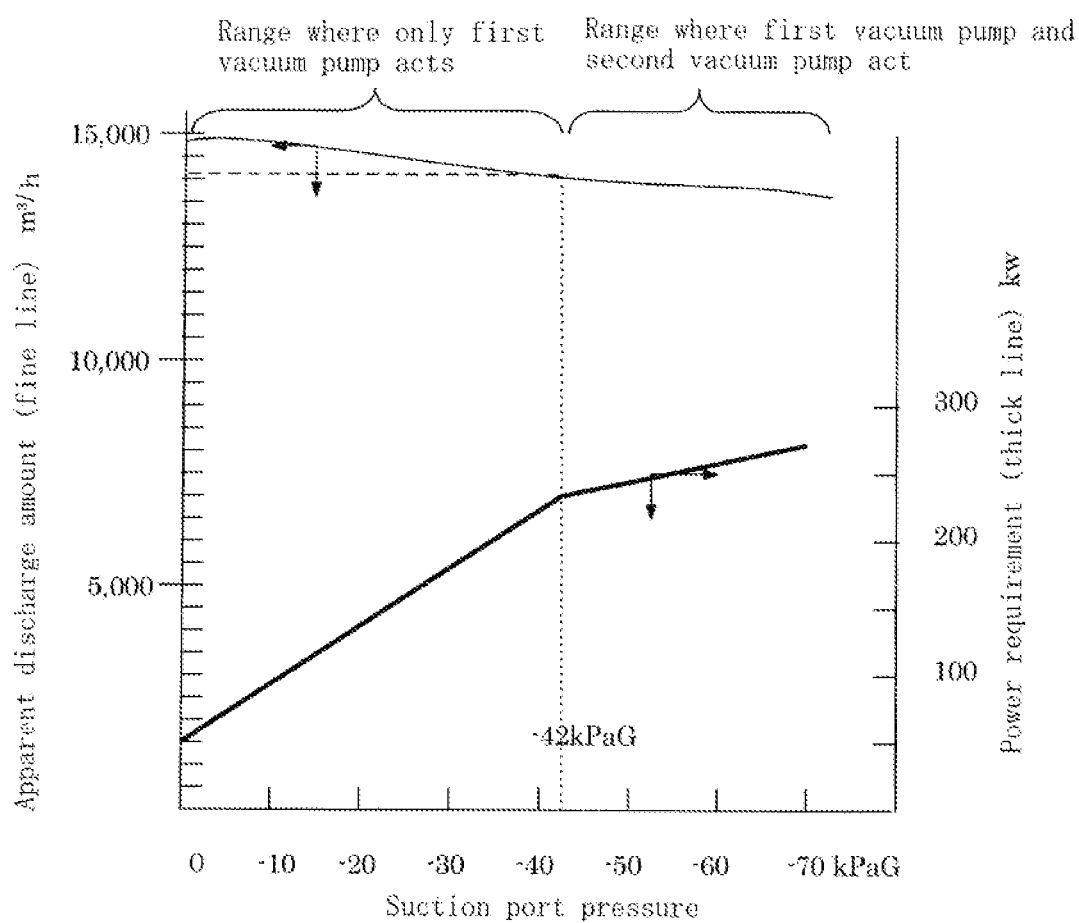
FIG. 8 is a graph showing the relationship of the suction port pressure with respect to the apparent discharge amount and an optimum power requirement of the double vacuum pump apparatus.

Meanwhile, an optimal relationship of the suction port pressure with respect to the apparent discharge amount (this refers to the discharge amount that is not converted to normal conditions, and the notation "N" indicating normal conditions is added in the case of referring to the discharge amount converted to normal conditions) and the power requirement is shown in FIG. 8 as the discharge amount characteristics of the double vacuum pump apparatus Y2. This relationship is not affected by the gas temperature. The point at which the pressure in the connection line 52 between the first vacuum pump 40A and the second vacuum pump 40B becomes equal to atmospheric pressure is in the vicinity of a point at which the pressure at the suction port 41 is about −42 kPaG, and this point will not change even if the gas adsorption amount of the adsorbent has changed as a result of a change in the temperature of the exhaust gas. Accordingly, providing the pressure detector 80 in the vicinity of the suction port 41 side on which no flow vibration occurs and previously setting the inlet pressure value (e.g., −42 kPaG) at a changing point at which the pressure inside the connection line 52 between the first vacuum pump 40A and the second vacuum pump 40B becomes equal to or greater than atmospheric pressure or becomes equal to or less than atmospheric pressure, it is possible to always operate the first vacuum pump 40A and the second vacuum pump 40B in an economical combination, thus operating the double vacuum pump apparatus Y2 with a minimum power requirement.

In the double vacuum pump apparatus Y2, during the period starting from the start of the depressurization regeneration step for the adsorption tower 10B and in which the excess gas is present from (i.e., when the discharge amount from the vacuum pump 40A exceeds the discharge capacity of the vacuum pump 40B), it is detected that the pressure on the suction port 41 side is higher than a pressure set value (e.g., −42 kPaG) of the pressure detector 80, and the on-off valve 61 of the bypass line 60 is turned to the open state, thereby controlling the gas flow so as to cause the excess gas to flow into the bypass line 60 from the connection line 52. Further, when this pressure has become the above-described pressure set value of the pressure detector 80, or in other words, when the discharge amount from the vacuum pump 40A gradually decreases to be equal to the discharge capacity of the vacuum pump 40B, the on-off valve 61 of the bypass line 60 is turned to the closed state, thereby bringing the two vacuum pumps 40A and 40B into a completely serial state.

During the period starting from the start of the depressurization regeneration step for the adsorption tower 10B and in which excess gas is generated, the excess gas flows into the bypass line 60 from the connection line 52, then passes through the buffer tube Z1 in the bypass line 60, subsequently through the on-off valve 61, is then introduced into the silencer Y3 (or a separate silencer Y3' shown in FIG. 5) via the ends E7 and E5, and thereby, the excess gas is discharged via the silencer Y3 to the outside of the gas purification system X1. Along with this, in a state in which excess gas is generated, the gas is also discharged from the discharge port 42 of the vacuum pump 40B connected to the vacuum pump 40A via the connection line 52. In this case, however, the substantive depressurization work is performed only in the upstream vacuum pump 40A, and the downstream vacuum pump 40B is substantially not involved in the depressurization. Since the discharge port 42 of the vacuum pump 40B is connected to the silencer Y3 via the piping 53, the gas that has passed through the vacuum pump 40B is discharged via the silencer Y3 to the outside of the gas purification system X1.

On the other hand, in a state in which no excess gas is generated in the depressurization regeneration step for the adsorption tower 10B, the vacuum pumps 40A and 40B that are in a completely serial state depressurize, in cooperation with each other, the interior of the adsorption tower 10B, which is the container to be depressurized, and thereby, a predetermined amount of gas is discharged from the vacuum pump 40B. This discharged gas is introduced via the piping 53 into the silencer Y3, and discharged to the outside of the gas purification system X1. At this time, the on-off valve 61 of the bypass line 60 is in the closed state, and therefore, no gas passes through the bypass line 60.

The depressurization regeneration step for the adsorption tower 10B in Step 1 described above is performed by operating the double vacuum pump apparatus Y2 so as to perform depressurization in the above-described manner. Likewise, the depressurization regeneration step for the adsorption tower 10A in Step 3 described above is performed by operating the double vacuum pump apparatus Y2 so as to perform depressurization in the same manner described with respect to the depressurization regeneration step for the adsorption tower 10B.

During the depressurizing operation of the double vacuum pump apparatus Y2, as described above, the on-off valve 61 that is in the open state at the start of depressurization is switched from the open state to the closed state as a result of detection of the pressure on the suction port 41 side by the pressure detector 80 when the discharge amount from the vacuum pump 40A gradually decreases to match the discharge capacity of the vacuum pump 40B. This configuration helps serially operating the vacuum pump 40A and the vacuum pump 40B in the latter part of the depressurization regeneration step, thus efficiently operating the double vacuum pump apparatus Y2. Moreover, the set value of the pressure detector 80 that can minimize the power requirement of the double vacuum pump apparatus Y2 is hardly affected by the temperature change, and therefore, there is no problem of increase in the power requirement due to the temperature change, in contrast to the case where the open/close control for the on-off valve 61 is performed by previously setting the time elapsed after the start of the depressurization.

Further, the double vacuum pump apparatus Y2 is configured such that the rotor 40b of the vacuum pump 40A and the rotor 40b of the vacuum pump 40B are rotationally driven in conjunction with each other by a single motor 51. This configuration is preferable for reducing the power requirement of the double vacuum pump apparatus Y2.

Next, the action of the buffer tube Z1 will be described in detail. As described above, in the double vacuum pump apparatus Y2, the discharge amount from the vacuum pump 40A changes according to the pressure at the suction port 41 side of the vacuum pump 40A connected to the adsorption tower 10A or the adsorption tower 10B, and the lower the pressure on the suction port 41, the smaller the amount of the gas exhaust. Accordingly, the discharge amount reaches its maximum value at the start of the depressurization regeneration step, and the amount of excess gas reaches its maximum value (flow rate) also at the start of the depressurization in a state in which excess gas (the portion of the discharge amount from the vacuum pump 40A that exceeds the discharge capacity of the vacuum pump 40B) is generated (the on-off valve 61 of the bypass line 60 is in the open state when excess gas is generated). Further, the velocity at which the excess gas flows into the bypass line 60 from the connection line 52 reaches its maximum also at the start of the depressurization. The time during which the excess gas passing through the buffer tube Z1 in the bypass line 60 resides in the buffer tube Z1 is the shortest when the excess gas passes through the buffer tube Z1 at the start of the depressurization at which the velocity of flowing into the bypass line 60 from the connection line 52 reaches its maximum. The time required for the excess gas to pass through the buffer tube Z1 at the start of the depressurization is referred to as a "minimum residence time within the buffer tube". In the double vacuum pump apparatus Y2, the buffer tube Z1 is configured such that the minimum residence time within the buffer tube is 0.15 second or more.

Relatively large flow vibration occurs in the gas discharged from the vacuum pump 40A during the depressurizing operation. In a state in which excess gas is generated in the double vacuum pump apparatus Y2, relatively large flow vibration occurs also in the excess gas flowing into the bypass line 60 from the connection line 52. In the case of omitting the buffer tube Z1 from the bypass line 60 of the double vacuum pump apparatus Y2, the mechanical degradation of a shaft 61a of the on-off valve 61 of the bypass line 60 is facilitated due to the flow vibration of such excess gas. The reason for this is that the shaft 61a that is continuously exposed to the gas flowing through the inside of the bypass line 60 while causing flow vibration is continuously provided with vibration energy by that gas and thus continuously vibrates in an improper manner. This vibration of the shaft 61a induces a local destruction of material structure constituting the shaft 61a, and hence promotes degradation of the mechanical strength of the shaft 61a. The degradation of the mechanical strength of the shaft 61a becomes particularly noticeable in the case of supplying sealing water into the pump mechanism of the vacuum pump 40A while operating the relevant pump apparatus. The level of vibration of the shaft 61a resulting from the flow vibration of the excess gas may reach a vibration acceleration of about 13 G or more.

In contrast, in the double vacuum pump apparatus Y2 according to this embodiment, the bypass line 60 is provided with the buffer tube Z1, which is configured such that the minimum residence time within the buffer tube is 0.15 second or more, and thereby, the flow vibration of the excess gas is efficiently attenuated in the buffer tube Z1 when the excess gas passes through the bypass line 60. Accordingly, in the double vacuum pump apparatus Y2, the degradation of the mechanical strength of the members located downstream of the buffer tube Z1 (in particular, the shaft 61a of the on-off valve 61) can be sufficiently suppressed.

Figure 9:
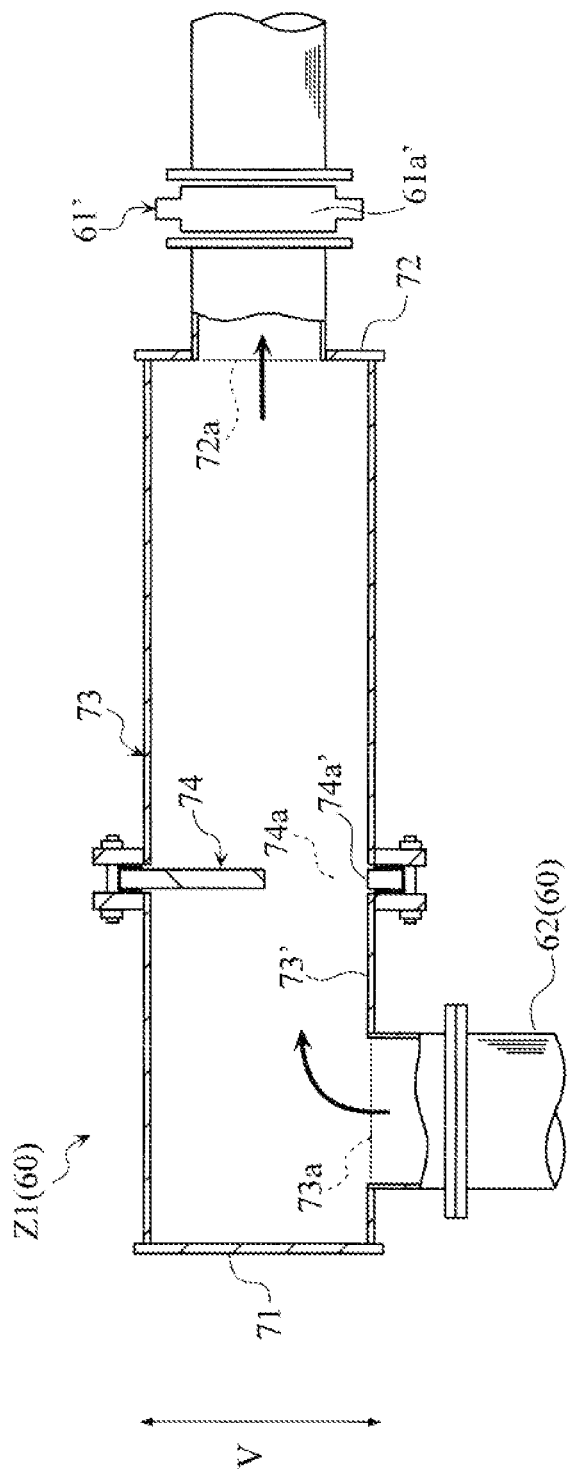
FIG. 9 is a diagram showing a modification of an on-off valve of a bypass line.

In the double vacuum pump apparatus Y2, as shown in FIG. 9, the bypass line 60 may include an on-off valve 61' having a check valve function, in place of the on-off valve 61. The on-off valve 61' is configured to assume the open state when the pressure on the buffer tube Z1 side of the on-off valve 61' is higher than the pressure on the end E7 side thereof in the bypass line 60 and to assume the closed state when the pressure on the buffer tube Z1 side becomes equal to or less than the pressure on the side of the end E7. During the depressurizing operation of the double vacuum pump apparatus Y2, the on-off valve 61' having this check valve function is in the open state immediately after the start of depressurization, and is automatically switched from the open state to the closed state when the discharge amount from the vacuum pump 40A gradually decreases to match the discharge capacity of the vacuum pump 40B (the pressure inside the connection line 52 at that time is approximately atmospheric pressure). This configuration helps reducing the operating loss of the vacuum pump 40B, thus efficiently operating the double vacuum pump apparatus Y2.

As described above, the buffer tube Z1 includes the orifice plate 74 as the constricted portion for locally narrowing the flow path of the gas passing through the interior thereof, and the opening ratio of the orifice plate 74 is preferably 20 to 46%, more preferably 29 to 39%. This configuration is useful for efficiently attenuating the above-described flow vibration of the excess gas passing through the buffer tube Z1. Furthermore, the orifice plate 74 is preferable for accurately adjusting its opening ratio as the constricted portion.

As described above, the distal end 74a' of the edge of the opening 74a is flush with the inner wall surface 73' of the buffer tube Z1. This configuration facilitate the passage through the buffer tube Z1 of water droplets (resulting from the above-described sealing water) contained in the excess gas passing though the buffer tube Z1.

The buffer tube Z1 may be configured such that the above-described minimum residence time within the buffer tube is 0.15 second or more by appropriately setting the length and/or inside diameter of the buffer tube Z1, without providing the orifice plate 74.

As described above, the buffer tube Z1 is configured such that the maximum flow velocity within the buffer tube of the gas passing through the buffer tube Z1 is 6 to 12 m/sec when the discharge amount from the discharge port 42 of the vacuum pump 40A exceeds the discharge capacity (suction capacity) of the vacuum pump 40B in the case where the on-off valve 61 (or 61') of the bypass line 60 is in the open state during the depressurizing operation of the double vacuum pump apparatus Y2. The flow velocity at which the excess gas passes through the buffer tube Z1 in the bypass line 60 is maximum at the start of depressurization, where the velocity of flowing into the bypass line 60 from the connection line 52 is maximum. The flow velocity at which the excess gas passes through the buffer tube Z1 at the start of depressurization is referred to as a "maximum flow velocity within the buffer tube". In order to efficiently emit the excess gas from the end E7 of the bypass line 60 while achieving a value of 0.15 second or more for the above-described minimum residence time within the buffer tube, it is preferable to configure the buffer tube Z1 such that the maximum flow velocity within the buffer tube is 6 to 12 m/sec.

As described above, the bypass line 60 includes the connecting tube portion 62, which is connected to the buffer tube Z1 at the gas inlet 73a provided at a location on the end wall 71 side of the surrounding wall 73 in the buffer tube Z1, for introducing gas into the buffer tube Z1. The connecting tube portion 62 preferably extends in a direction intersecting with the extending direction (horizontal direction H in FIG. 3) of the surrounding wall 73, preferably extends in a direction orthogonal (vertical direction V) thereto, or more preferably, it extends in the vertical direction V and is connected to the surrounding wall 73 from below in the vertical direction V. This configuration is suitable for realizing a size reduction for the buffer tube Z1 while achieving a value of 0.15 second or more for the above-described minimum residence time within the buffer tube.

Figure 10:
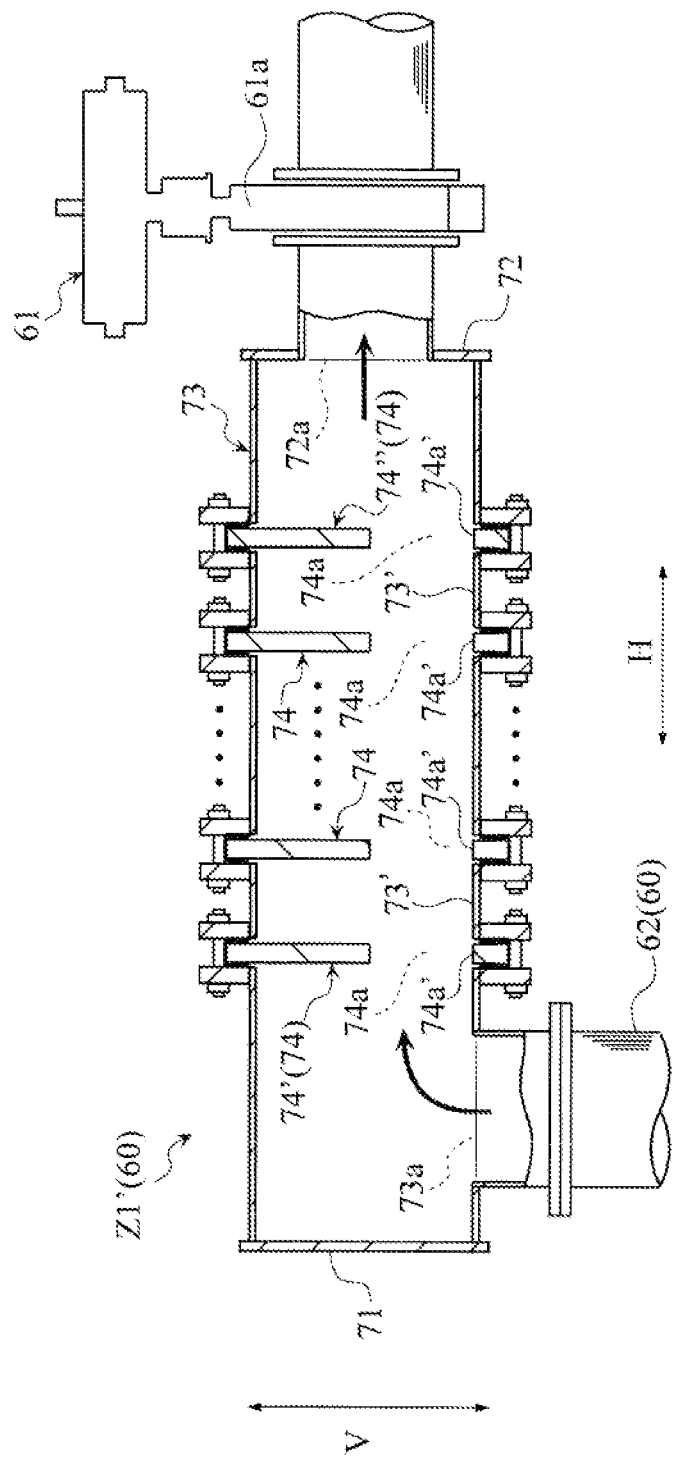
FIG. 10 is a schematic partial cross-sectional view of a first modification of the buffer tube and the vicinity thereof.

FIG. 10 is a schematic partial cross-sectional view of a buffer tube Z1' as a first modification and the vicinity thereof. The buffer tube Z1' includes an end wall 71 on the end E6 side in the bypass line 60, an end wall 72 on the end E7 side, a surrounding wall 73 extending between the end walls 71 and 72, and a plurality of orifice plates 74, and the end wall 71 is cylindrical. Each of the orifice plates 74 is a constricted portion for locally narrowing the flow path of the gas passing through the interior of the buffer tube Z1', and has an opening 74a. The plurality of orifice plates 74 are aligned along the gas flow path inside the buffer tube Z1', and include an orifice plate 74' located most upstream in the gas flow path and an orifice plate 74" located most downstream. The buffer tube Z1' having this configuration attenuates the flow vibration of the excess gas by the plurality of orifice plates 74 in a step-wise manner, and thus can increase the effect of attenuating flow vibration.

Figure 11:
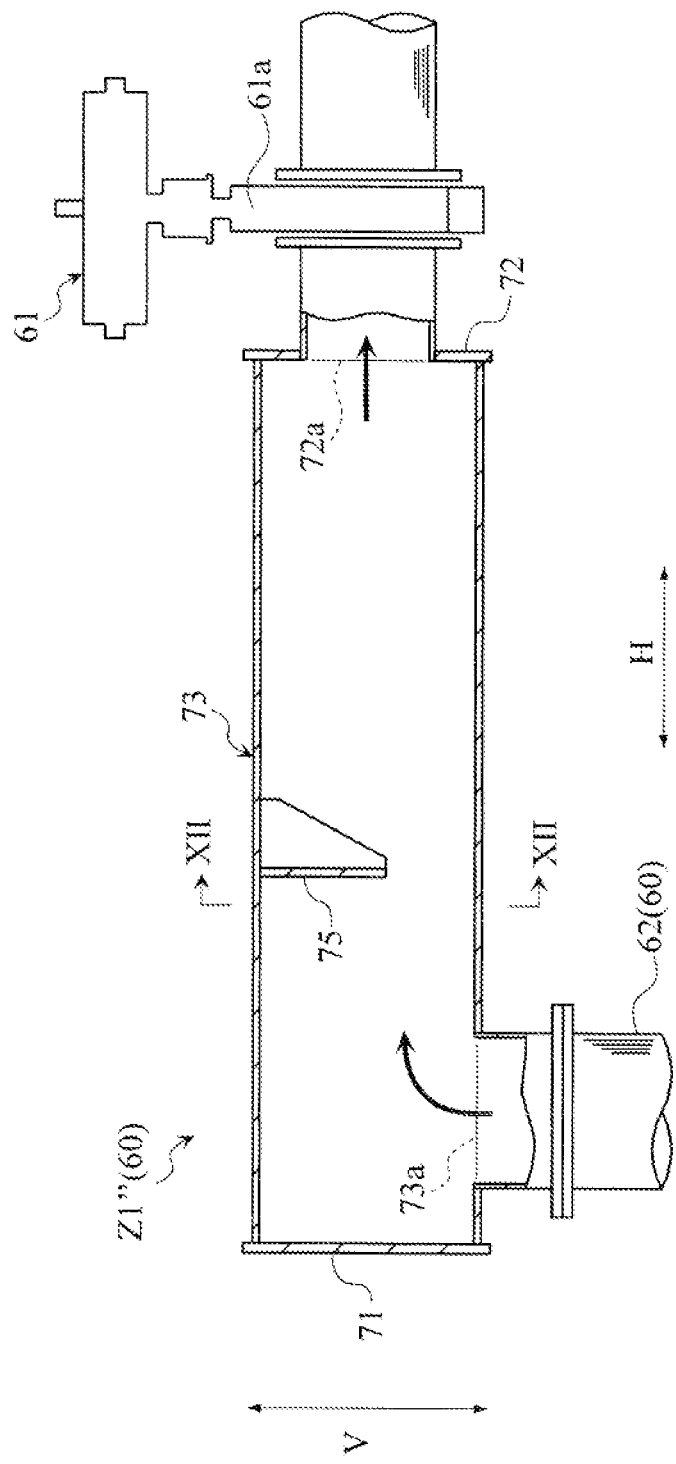
FIG. 11 is a schematic partial cross-sectional view of a second modification of the buffer tube and the vicinity thereof.
Figure 12:
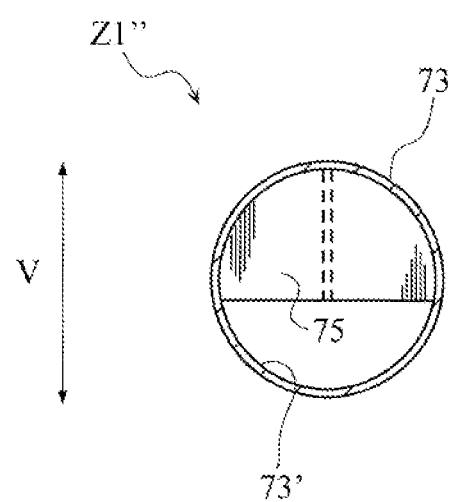
FIG. 12 is a cross-sectional view taken along the arrows XII-XII in FIG. 11.

FIGS. 11 and 12 show a buffer tube Z1' as a second modification. The buffer tube Z1" includes an end wall 71 on the end E6 side in the bypass line 60, an end wall 72 on the end E7 side, a surrounding wall 73 extending between the end walls 71 and 72, and a baffle plate 75, and the surrounding wall 73 is cylindrical. The baffle plate 75 is a constricted portion for locally narrowing the flow path of the gas passing through the interior of the buffer tube Z1". The opening ratio of the baffle plate 75 is preferably 20 to 46%, more preferably 29 to 39%. The opening ratio of the baffle plate 75 refers to the ratio of the cross-sectional area of the gas flow path that is not occupied by the baffle plate 75 to the cross-sectional area of the buffer tube Z1". The buffer tube Z1" having this configuration functions as the constricted portion of the baffle plate 75, and efficiently attenuates the flow vibration of the excess gas. Furthermore, the opening ratio of the baffle plate 75 can be more easily adjusted than that of an orifice plate.

The buffer tube Z1" may include a plurality of baffle plates 75. In this case, the plurality of baffle plates 75 are arranged along the gas flow path at appropriate intervals, and include a first baffle plate located most upstream in the gas flow path and a second baffle plate located most down stream. The buffer tube having this configuration attenuates the flow vibration of the excess gas by the plurality of baffle plates 75 in a step-wise manner, and thus can increase the effect of attenuating flow vibration.

Figure 13:
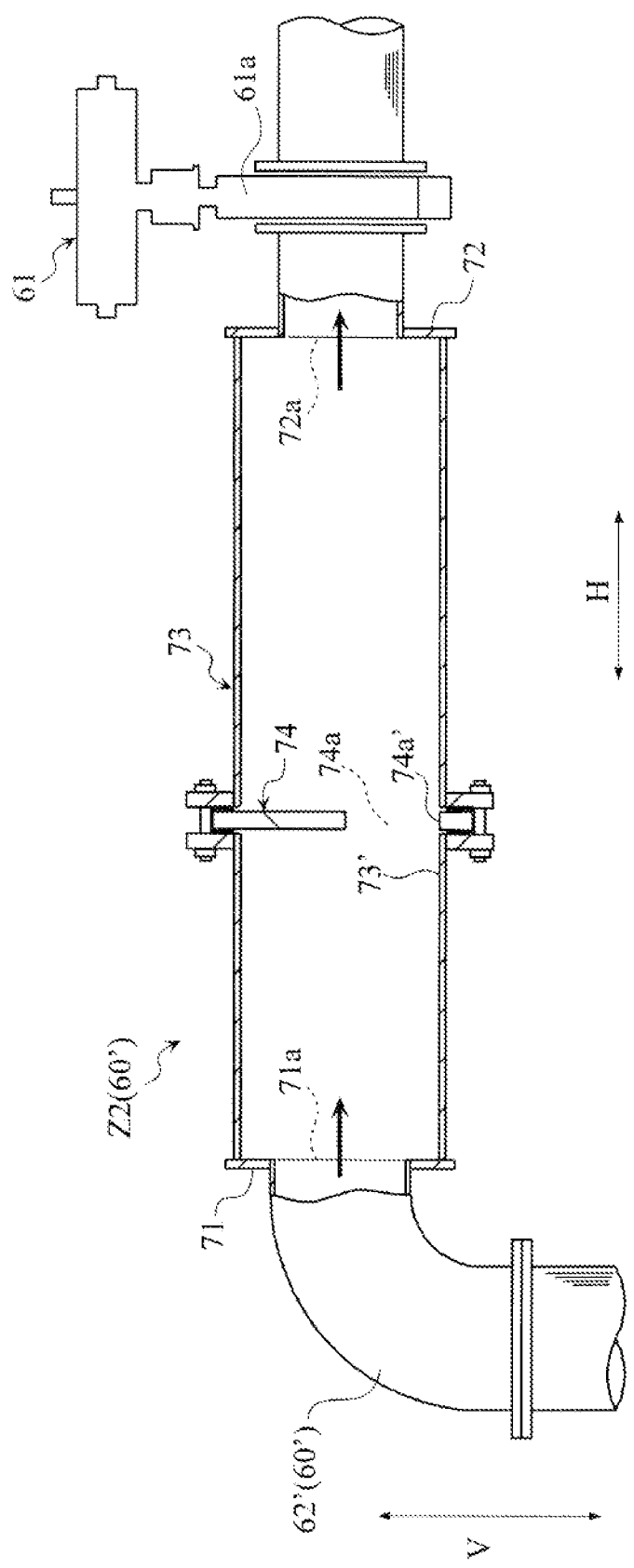
FIG. 13 is a schematic partial cross-sectional view of a third modification of the buffer tube and the vicinity thereof.
Figure 14:
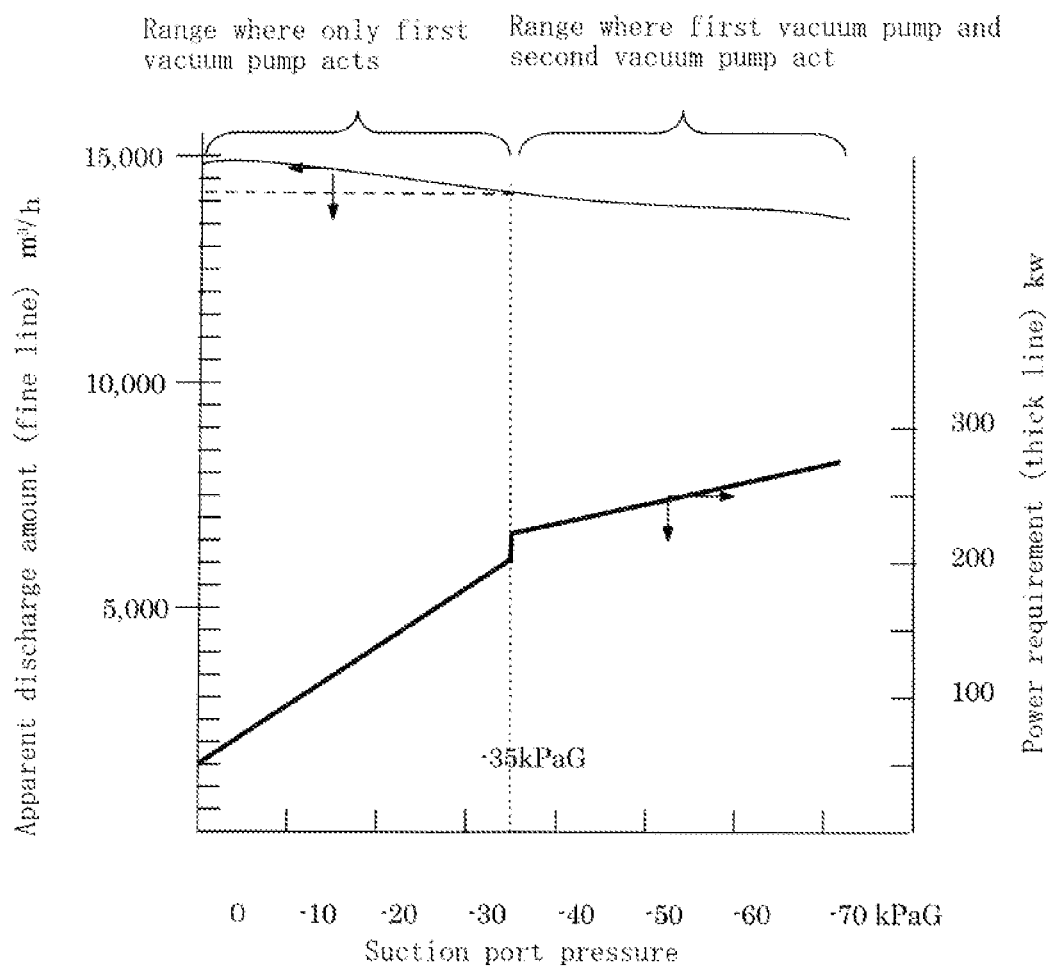
FIG. 14 is a graph showing the relationship of the suction port pressure of the double vacuum pump apparatus with respect to the apparent discharge amount and the power requirement when the on-off valve of the bypass line is closed at an early timing.

FIGS. 13 and 14 show a buffer tube Z2 as a third modification. The buffer tube Z2 includes an end wall 71 on the end E6 side of the bypass line 60', an end wall 72 on the end E7 side, a surrounding wall 73 extending between the end walls 71 and 72, and an orifice plate 74, and the surrounding wall 73 is cylindrical. The end wall 71 is provided with a gas inlet 71a and the end wall 72 is provided with a gas outlet 72a. The buffer tube Z2 is different from the buffer tube Z1 shown in FIG. 3 in that the gas inlet is provided in the end wall 71 instead of in the surrounding wall 73, but the rest of the configuration is the same as that of the buffer tube Z1 shown in FIG. 3.

Meanwhile, the connecting tube portion 62' of the bypass line 60' is connected to the buffer tube Z2 at the gas inlet 71a provided in the end wall 71. The connecting tube portion 62' is located immediately upstream of the buffer tube Z2 in the bypass line 60', and defines the flow path for the gas immediately before it is introduced into the buffer tube Z2. Further, the connecting tube portion 62' has a bent structure for bending the flow of the gas immediately before it is introduced into the buffer tube Z2. Preferably, the connecting tube portion 62' has a bent structure for bending the flow of the gas immediately before it is introduced into the buffer tube Z2 at 90 degrees. More preferably, the connecting tube portion 62' is arranged so as to guide the gas from below in the vertical direction V into the buffer tube Z2.

Although embodiments and various modifications of the present invention have been described above, these may be combined with one another. For example, the buffer tube Z2 shown in FIG. 13 may be combined with the on-off valve 61' having the check valve function shown in FIG. 9. In the buffer tube Z2 shown in FIG. 13, a plurality of orifice plates 74 may be provided as shown in FIG. 10, or a single baffle plate 75 (or a plurality of baffle plates 75) shown in FIG. 11 may be provided. Furthermore, the orifice plate 74 shown in FIG. 3 may be combined with the baffle plate 75 shown in FIG. 11.

EXAMPLES

Next, examples of the present invention will be described together with comparative examples. It should be noted, however, that the comparative examples are merely test examples carried out by the Applicant in order to confirm the effects of the present invention and they do not belong to any known art.

Example 1

With the discharge capacity of the first vacuum pump 40A of the double vacuum pump apparatus Y2 set to 14,800 m$^3$/h and the discharge capacity of the second vacuum pump 40B set to 14,100 m$^3$/h, these pumps were connected in series as roots pumps, and a cycle (Steps 1 to 4) including the adsorption step, the depressurization regeneration step, and the pressure restoration step shown in FIG. 6 was repeated in each of the adsorption towers 10A and 10B when the gas temperature was 30° C., using the gas purification system X1 shown in FIG. 1, and thereby, oxygen was obtained from air serving as a source gas. In this example, the amount of air supplied by the source blower 21 of the PSA apparatus Y1 was 8,300 N m$^3$/h ("N" indicates normal conditions; the same also applies to the following). The internal pressure of the adsorption towers 10A and 10B undergoing the adsorption step was a maximum of 40 kPaG. Further, the internal pressure of the adsorption towers 10A and 10B undergoing the depressurization regeneration step was −69 kPaG at the late stage of the depressurization regeneration step, and the internal pressure of the adsorption towers 10A and 10B undergoing the pressure restoration step was returned to atmospheric pressure. Further, the depressurization regeneration step for the adsorption towers 10A and 10B was set such that the on-off valve 61 is switched from the open state to the closed state when the pressure on the suction port 41 side had reached a pressure value of −42 kPaG in the pressure detector 80 as the characteristics shown in FIG. 8.

In this example, the double vacuum pump apparatus Y2 was operated to perform depressurization in the following manner. In a period starting from the start of the depressurization regeneration step and in which the indicated value of the pressure detector 80 is approximately atmospheric pressure to −42 kPaG, or in other words, when the discharge amount from the vacuum pump 40A exceeds the discharge capacity of the vacuum pump 40B, the gas flow was controlled by sending a signal to the on-off valve 61 of the bypass line 60 to switch the on-off valve 61 to the open state so as to cause the excess gas to flow into the bypass line 60 from the connection line 52. Then, when the discharge amount from the vacuum pump 40A gradually decreased to match the discharge capacity of the vacuum pump 40B, or in other words, when the pressure detector 80 indicated a value of −42 kPaG, the on-off valve 61 was switched from the open state to the closed state so as to bring the two vacuum pumps 40A and 40B in a completely serial state, and thereafter the depressurizing operation of the double vacuum pump apparatus Y2 was continued. As a result, the accumulated average power requirement of the vacuum pumps was 206 kw.

Example 2

With the discharge capacity of the first vacuum pump 40A of the double vacuum pump apparatus Y2 set to 14,800 m$^3$/h and the discharge capacity of the second vacuum pump 40B set to 14,100 m$^3$/h, these pumps were connected in series as roots pumps, and a cycle (Steps 1 to 4) including the adsorption step, the depressurization regeneration step, and the pressure restoration step shown in FIG. 6 was repeated in each of the adsorption towers 10A and 10B when the gas temperature was 40° C., using the gas purification system X1 shown in FIG. 1, and thereby, oxygen was obtained from air serving as a source gas. Further, the amount of air supplied by the source blower 21 of the PSA apparatus Y1 was 8,300 N m$^3$/h. The internal pressure of the adsorption towers 10A and 10B undergoing the adsorption step was a maximum of 40 kPaG. The internal pressure of the adsorption towers 10A and 10B undergoing the depressurization regeneration step decreased to −72 kPaG at the late stage of the depressurization regeneration step, and the internal pressure of the adsorption towers 10A and 10B undergoing the pressure restoration step was returned to atmospheric pressure. Further, the depressurization regeneration step for the adsorption towers 10A and 10B was set such that the on-off valve 61 is switched from the open state to the closed state when the pressure on the suction port 41 side had reached a pressure value of −42 kPaG in the pressure detector 80 as the characteristics shown in FIG. 4.

The same operation as that in Example 1 was performed for the double vacuum pump apparatus Y2. When the pressure detector 80 indicated a value of −42 kPaG, the on-off valve 61 was switched from the open state to the closed state so as to bring the two vacuum pumps 40A and 40B in a completely serial state, and thereafter the depressurizing operation of the double vacuum pump apparatus Y2 was continued. As a result, the accumulated average power requirement of the vacuum pump was 213 kw.

Comparative Example 1

As in Example 1, with the discharge capacity of the first vacuum pump 40A of the double vacuum pump apparatus Y2 set to 19,800 m$^3$/h and the discharge capacity of the second vacuum pump 40B set to 14,100 m$^3$/h, these pumps were connected in series as roots pumps, and a cycle (Steps 1 to 4) including the adsorption step, the depressurization regeneration step, and the pressure restoration step shown in FIG. 6 was repeated in each of the adsorption towers 10A and 10B when the gas temperature was 30° C., using the gas purification system X1 shown in FIG. 1, and thereby, oxygen was obtained from air serving as a source gas. In this comparison, the amount of air supplied by the source blower 21 of the PSA apparatus Y1 was 8,300 N m$^3$/h as in Example 1. The internal pressure of the adsorption towers 10A and 10B undergoing the adsorption step was a maximum of 40 kPaG. Further, the final pressure in the adsorption towers 10A and 10B undergoing the depressurization regeneration step was −69 kPaG. The switching of the on-off valve 61 from the open state to the closed state was performed such that the on-off valve 61 is turned from the open state to the closed state after 7.5 seconds of the depressurization regeneration time as shown in FIG. 7. The pressure at the suction port 41 was indicated as −35 kPaG. The internal pressure of the adsorption towers 10A and 10B undergoing the pressure restoration step was returned to atmospheric pressure.

The double vacuum pump apparatus Y2 was operated to perform depressurization in the following manner. During a period in which the pressure at the suction port 41 changed from approximately atmospheric pressure to −35 kPaG over 7.5 seconds from the start of the depressurization regeneration step, the on-off valve 61 of the bypass line 60 was turned to the open state, then the on-off valve 61 was forcibly switched from the open state to the closed state so as to bring the two vacuum pumps 40A and 40B in a completely serial state, and thereafter the depressurizing operation of the double vacuum pump apparatus Y2 was continued. As a result, the accumulated average power requirement of the vacuum pumps 40A and 40B was 216 kw, which is larger by 10 kw than in the case where the control using the pressure detector 80 on the suction port 41 side was not performed.

Note that the relationship between the suction port pressure, the apparent discharge amount, and the power requirement that corresponds to Comparative Example 1 is shown in the graph in FIG. 14.

Comparative Example 2

As in Example 2, with the discharge capacity of the first vacuum pump 40A of the double vacuum pump apparatus Y2 set to 14,800 m³/h and the discharge capacity of the second vacuum pump 40B set to 14,100 m³/h, these pumps were connected in series as roots pumps, and a cycle (Steps 1 to 4) including the adsorption step, the depressurization regeneration step, and the pressure restoration step shown in FIG. 6 was repeated in each of the adsorption towers 10A and 10B when the gas temperature was 40° C., using the gas purification system X1 shown in FIG. 1, and thereby, oxygen was obtained from air serving as a source gas. In this comparison, the amount of air supplied by the source blower 21 of the PSA apparatus Y1 was 8,300 N m³/h as in Example 2. The internal pressure of the adsorption towers 10A and 10B undergoing the adsorption step was a maximum of 40 kPaG. Further, the final pressure in the adsorption towers 10A and 10B undergoing the depressurization regeneration step was −72 kPaG. The switching of the on-off valve 61 from the open state to the closed state was performed such that the on-off valve 61 is switched from the open state to the closed state after 15 seconds of the depressurization regeneration time as shown in FIG. 8. The pressure at the suction port 41 was indicated as −50 kPaG. The internal pressure of the adsorption towers 10A and 10B undergoing the pressure restoration step was returned to atmospheric pressure.

The double vacuum pump apparatus Y2 was operated to perform depressurization in the following manner. During a period in which the pressure at the suction port 41 changed from approximately atmospheric pressure to −50 kPaG over 15 seconds from the start of the depressurization regeneration step, the on-off valve 61 of the bypass line 60 was switched to the open state, then the on-off valve 61 was forcibly switched from the open state to the closed state so as to bring the two vacuum pumps 40A and 40B in a completely serial state, and thereafter the depressurizing operation of the double vacuum pump apparatus Y2 was continued. As a result, the accumulated average power requirement of the vacuum pumps 40A and 40B was 224 kw, which is larger by 11 kw than in the case where the control was not performed using the pressure detector 80 on the suction port 41 side.

Figure 15:
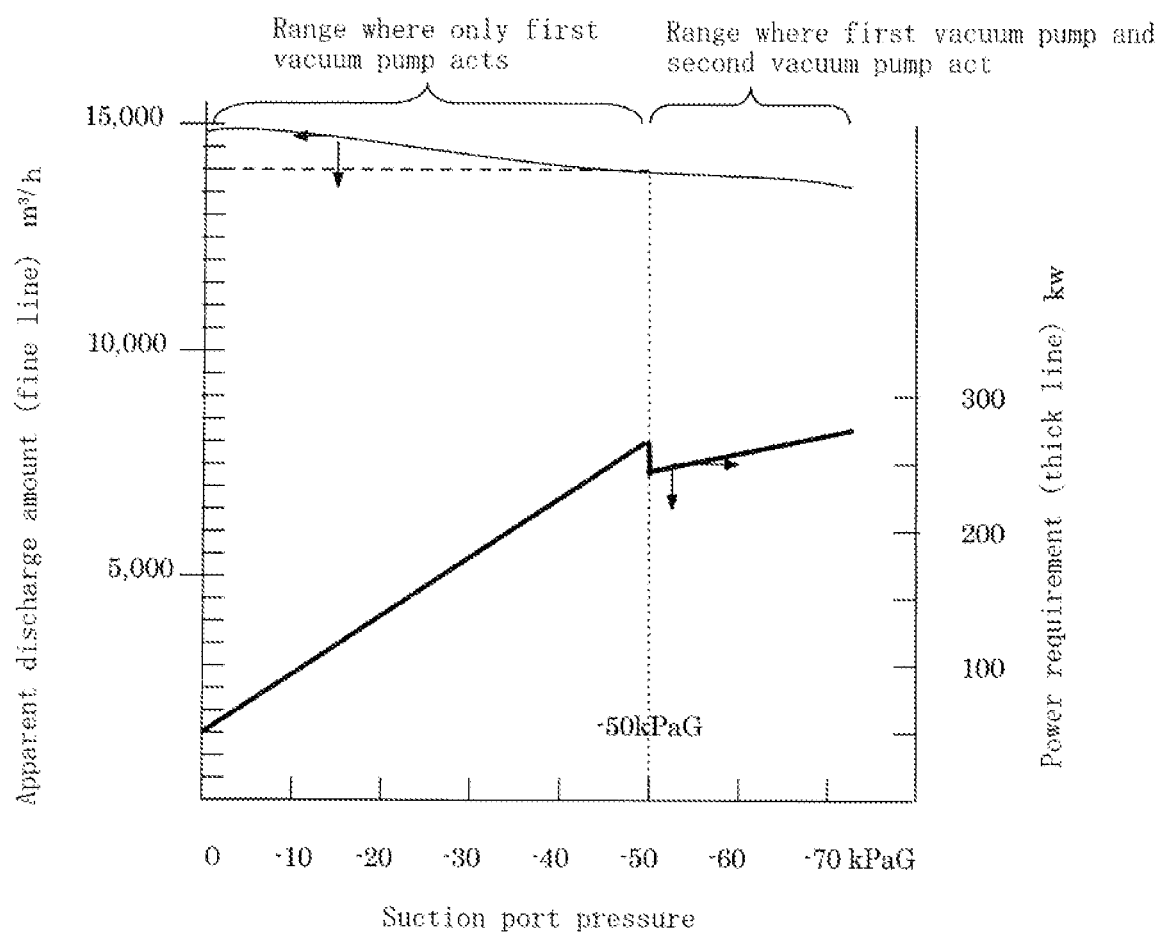
FIG. 15 is a graph showing the relationship of the suction port pressure of the double vacuum pump apparatus with respect to the apparent discharge amount and the power requirement when the on-off valve of the bypass line is closed at a late timing.

Note that the relationship between the suction port pressure, the apparent discharge amount, and the power requirement that corresponds to Comparative Example 2 is shown in the graph in FIG. 15.

Evaluation of Examples 1 and 2 and Comparative Example 1 and 2

Based on Examples 1 and 2 and Comparative Examples 1 and 2 described above, the following evaluation can be made. That is, by switching the on-off valve 61 from the open state to the closed state at the point when the discharge amount from the upstream vacuum pump 40A in the double vacuum pump apparatus Y2 has decreased to match the discharge capacity from the downstream the vacuum pump 40B (at that point, the internal pressure of the connection line 52 was approximately atmospheric pressure), it is possible to minimize the power consumption in the double vacuum pump apparatus Y2. Furthermore, even if the temperature has changed (30° C. in Example 1 and 40° C. in Example 2), the pressure at the suction port 41 of the upstream vacuum pump 40A a is substantially constant value (−42 kPaG in Examples 1 and 2) at the point when the discharge amount from the upstream vacuum pump 40A in the double vacuum pump apparatus Y2 has decreased to match the discharge capacity from the downstream vacuum pump 40B. Accordingly, the effect of the temperature change can be avoided by measuring the pressure in the vicinity of the suction port 41 of the upstream vacuum pump 40A and controlling the on-off valve 61 so as to open or close.

Example 3

A cycle (Steps 1 to 4) including the adsorption step, the depressurization regeneration step, and the pressure restoration step shown in FIG. 6 was repeated in each of the adsorption towers 10A and 10B using a gas purification system X1 having the same configuration as that shown in FIGS. 1 to 4 except that the buffer tube Z1 of the double vacuum pump apparatus Y2 does not have the orifice plate 74, and thereby oxygen was obtained from air serving as source gas. In this example, the amount of air supplied by the source blower 21 of the PSA apparatus Y1 was set to 9,800 N m³/h. The internal pressure of the adsorption towers 10A and 10B undergoing the adsorption step was set to atmospheric pressure, the internal pressure of the adsorption towers 10A and 10B undergoing the depressurization regeneration step at the late stage of the depressurization regeneration step was set to −530 mmHg (gauge pressure: about −70 kPaG), and the internal pressure of the adsorption towers 10A and 10B undergoing the pressure restoration step was returned to atmospheric pressure. Further, the depressurization regeneration step for the adsorption towers 10A and 10B was performed by operating a double vacuum pump apparatus Y2 having the same configuration as that described above except that the buffer tube Z1 does not include the orifice plate 74, so as to perform depressurization. A roots pump having a discharge capacity of 10,000 m³/h was used as the vacuum pump 40A. A roots pump having a discharge capacity of 6,053 m³/h was used as the vacuum pump 40B. A buffer tube having an inner dimension in the extending direction (length) of 4.4 m and an inside diameter of 400 mm was used as the buffer tube Z1 (without the orifice plate 74).

The double vacuum pump apparatus Y2 was operated to perform depressurization in the following manner. During a predetermined period from the start of the depressurization regeneration step and when excess gas is present (i.e., when the discharge amount from the vacuum pump 40A exceeds the discharge capacity of the vacuum pump 40B), the on-off valve 61 of the bypass line 60 was turned to the open state, thus controlling the gas flow so as to cause the excess gas to flow into the bypass line 60 from the connection line 52. Then, when the discharge amount from the vacuum pump 40A has gradually decreased to match the discharge capacity of the vacuum pump 40B, the on-off valve 61 was automatically switched from the open state to the closed state so as to bring the two vacuum pumps 40A and 40B in completely serial state, and then the depressurizing operation for the double vacuum pump apparatus Y2 was continued.

As a result of measuring the minimum residence time of the excess gas (the time required for the excess gas to pass through the buffer tube Z1 immediately after the start of depressurization) during the depressurizing operation of the double vacuum pump apparatus Y2 for the buffer tube Z1, it was 0.50 seconds. As a result of measuring the vibration acceleration applied to the shaft 61a of the on-off valve 61 in the open state, the maximum value was 3.0 G. A vibration meter (VM-61 manufactured by RION Co., Ltd.) was used for the vibration acceleration measurement. The results of the measurement for Example 3 are listed in the table shown in FIG. 16.

Examples 4 to 9

Using the same gas purification system X1 as that in Example 3 except that the length of the buffer tube Z1 (without the orifice plate 74) in the double vacuum pump apparatus Y2 was changed from 4.4 m to 3.6 m (Example 4), 2.8 m (Example 5), 2.1 m (Example 6), 1.5 m (Example 7), 1.3 m (Example 8), or 1.05 m (Example 9), a cycle including the adsorption step, the depressurization regeneration step, and the pressure restoration step was repeated for each of the adsorption towers 10A and 10B while operating the double vacuum pump apparatus Y2 to perform depressurization in the depressurization regeneration step, and thereby, oxygen was obtained from air serving as a source gas.

The minimum residence time within the buffer tube during the depressurizing operation of the double vacuum pump apparatus Y2 was measured for the buffer tube Z1 of the double vacuum pump apparatus Y2 in Examples 4 to 9, and the results were as follows: 0.41 second (Example 4), 0.32 second (Example 5), 0.24 second (Example 6), 0.17 second (Example 7), 0.15 second (Example 8), and 0.12 second (Example 9). As a result of measuring the vibration acceleration applied to the shaft 61a of the on-off valve 61 in the open state during the depressurizing operation for the double vacuum pump apparatuses Y2 of Examples 4 to 9, the maximum values were as follows: 3.1 G (Example 4), 3.1 G (Example 5), 3.2 G (Example 6), 4.5 G (Example 7), 5.5 G (Example 8), and 7.0 G (Example 9). The results of the measurement for Examples 4 to 9 are shown in the table in FIG. 16.

Comparative Example 3

Figure 17:
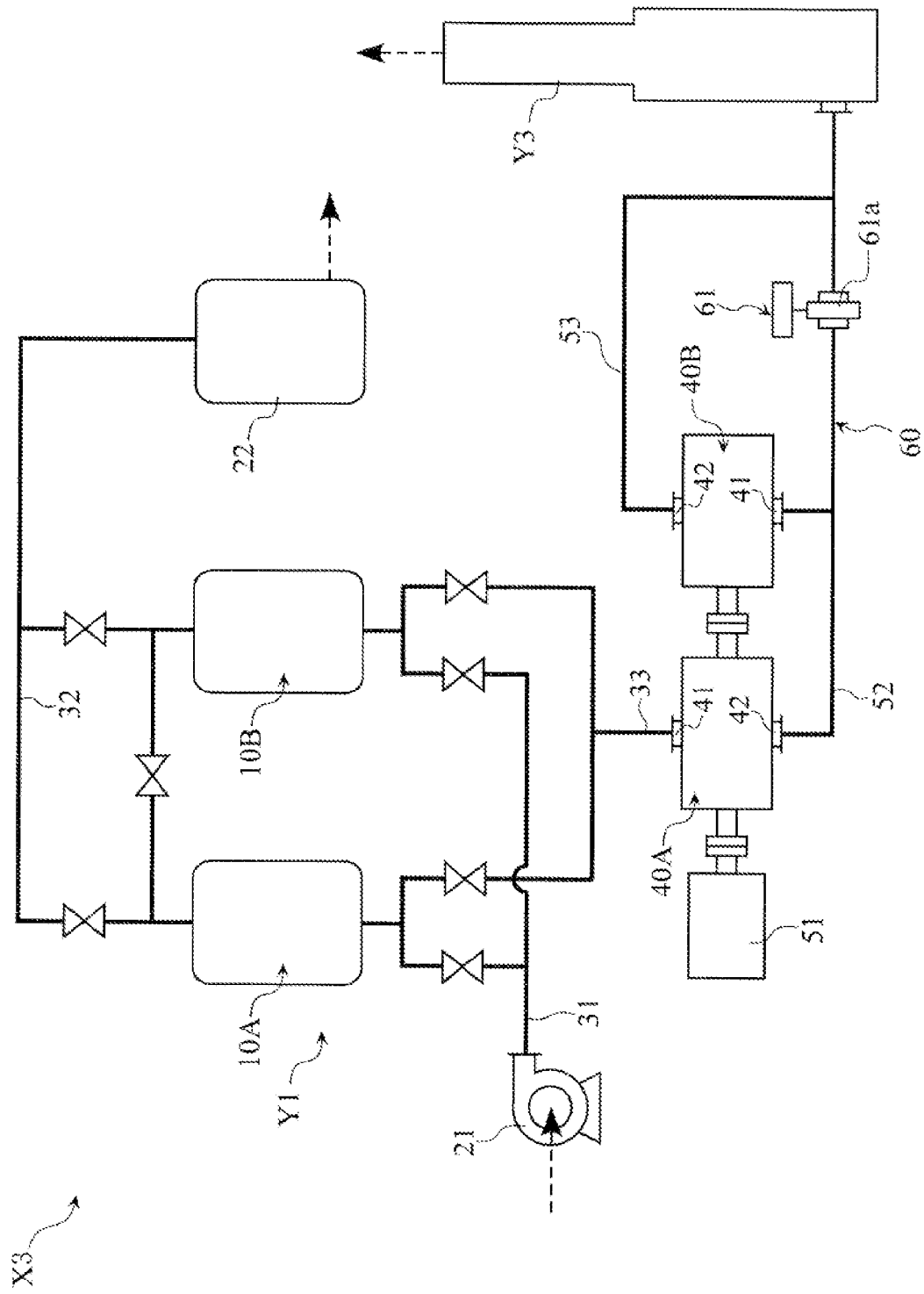
FIG. 17 is a diagram showing a schematic configuration of a gas purification system according to Comparative Example 3.

A cycle (Steps 1 to 4) including the adsorption step, the depressurization regeneration step, and the pressure restoration step shown in FIG. 6 was repeated in each of the adsorption towers 10A and 10B, using a gas purification system X3 as shown in FIG. 17, and thereby, oxygen was obtained from air serving as a source gas. The gas purification system X3 used in Comparative Example 3 has the same configuration as, for example, the gas purification system X1 used in Example 3 except that it is not provided with the buffer tube Z1. In Comparative Example 3, the depressurization regeneration step for the adsorption towers 10A and 10B was performed by operating the vacuum pumps 40A and 40B to perform pressurization in the same manner as in Example 3 except that gas was not passed through the buffer tube (the on-off valve 61 of the bypass line 60 was switched from the open state to the closed state in the middle of the depressurization regeneration step). As a result of measuring the vibration acceleration applied to the shaft 61a of the on-off valve 61 in the open state during the depressurizing operation of the vacuum pumps 40A and 40B of Comparative Example 3, the maximum value was 13.5 G.

Figure 18:
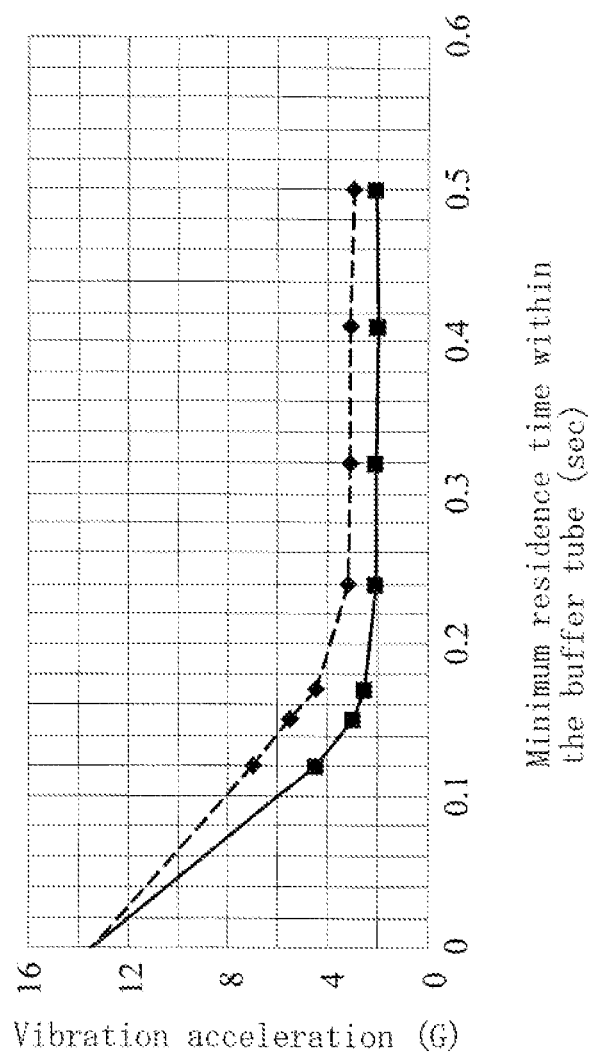
FIG. 18 is a graph showing the results of measurement for Examples 3 to 16 and Comparative Example 3.

The above-described results of measurement for Examples 3 to 9 and Comparative Example 3 are indicated on the broken line in the graph of FIG. 18. In the graph of FIG. 18, the horizontal axis represents the minimum residence time within the buffer tube (sec) and the vertical axis represents the vibration acceleration (G) of the shaft of the on-off valve. Since no buffer tube is provided in Comparative Example 3, the reading on the horizontal axis in the graph of FIG. 18 is zero.

Example 10

As in Example 3, while operating the double vacuum pump apparatus Y2 to perform depressurization in the depressurization regeneration step, a cycle including the adsorption step, the depressurization regeneration step, and the pressure restoration step was repeated in the adsorption towers 10A and 10B, using the same gas purification system X1 as in Example 3 except that the buffer tube Z1 in the double vacuum pump apparatus Y2 included the orifice plate 74, and thereby, oxygen was obtained from air serving as a source gas. The orifice plate 74 was provided at a location in the buffer tube Z1 that was 500 mm away from the end wall 71 located on the gas inlet side. In this example, an orifice plate having an opening 74a with a diameter of 230 mm was used as the orifice plate 74. The opening ratio of the orifice plate 74 (the diameter of the opening 74a was 230 mm) in the buffer tube Z1 having an inside diameter of 400 mm was 33%.

As a result of measuring the minimum residence time within the buffer tube during the depressurizing operation of the double vacuum pump apparatus Y2 for the buffer tube Z1 (having the orifice plate 74) of the double vacuum pump apparatus Y2 in Example 10 as in Example 3, it was 0.50 second. Further, as a result of measuring the vibration acceleration applied to the shaft 61a of the on-off valve 61 in the open state during the depressurizing operation of the double vacuum pump apparatus Y2, the maximum value was 2.1 G. These results of measurement for Example 9 are shown in the table in FIG. 16.

Examples 11 to 16

Using the gas purification system X1 shown in FIG. 1 except that the length of the buffer tube Z1 (with the orifice plate 74) in the double vacuum pump apparatus Y2 was changed from 4.4 m to 3.6 m (Example 11), 2.8 m (Example 12), 2.1 m (Example 13), 1.5 m (Example 14), 1.3 m (Example 15), or 1.05 m (Example 16), a cycle including the adsorption step, the depressurization regeneration step, and the pressure restoration step was repeated for each of the adsorption towers 10A and 10B while operating the double vacuum pump apparatus Y2 to perform depressurization in the depressurization regeneration step as in Example 3, and thereby, oxygen was obtained from air serving as a source gas.

As in Example 3, the minimum residence time within the buffer tube during the depressurizing operation of the double vacuum pump apparatus Y2 was measured for the buffer tube Z1 of the double vacuum pump apparatus Y2 in Examples 11 to 16, and the results were as follows: 0.41 second (Example 11), 0.32 second (Example 12), 0.24 second (Example 13), 0.17 second (Example 14), 0.15 second (Example 15), and 0.12 second (Example 16). As a result of measuring the vibration acceleration applied to the shaft 61a of the on-off valve 61 in the open state during the depressurizing operation for the double vacuum pump apparatuses Y2, the maximum values were as follows: 2.0 G (Example 11), 2.1 G (Example 12), 2.1 G (Example 13), 2.5 G (Example 14), 3.0 G (Example 15), and 4.5 G (Example 16). The results of the measurement for Examples 11 to 16 are shown in the table in FIG. 16. In addition, the results of measurement for Examples 9 to 16 and Comparative Example 3 described above are indicated on the solid line on the graph in the FIG. 18.

Examples 17 to 22

Using the same gas purification system X1 as that in Example 10 except that the diameter of the opening 79a of the orifice plate 74 of the buffer tube Z1 in the double vacuum pump apparatus Y2 was changed from 230 mm to 180 mm (Example 17), 200 mm (Example 18), 215 mm (Example 19), 230 mm (Example 20), 250 mm (Example 21), or 270 mm (Example 22), a cycle including the adsorption step, the depressurization regeneration step, and the pressure restoration step was repeated in each of the adsorption towers 10A and 10B, while operating the double vacuum pump apparatus Y2 in the depressurization regeneration step, and thereby, oxygen was obtained from air serving as a source gas. The opening ratio of the orifice plate 74 in Example 17 in the buffer tube Z1 having an inside diameter of 400 mm was 20%, the opening ratio of the orifice plate 74 in Example 18 was 25%, the opening ratio of the orifice plate 74 in Example 19 was 29%, the opening ratio of the orifice plate 74 in Example 20 was 33%, the opening ratio of the orifice plate 74 in Example 21 was 39%, and the opening ratio of the orifice plate 74 of Example 22 was 46%.

Figure 20:
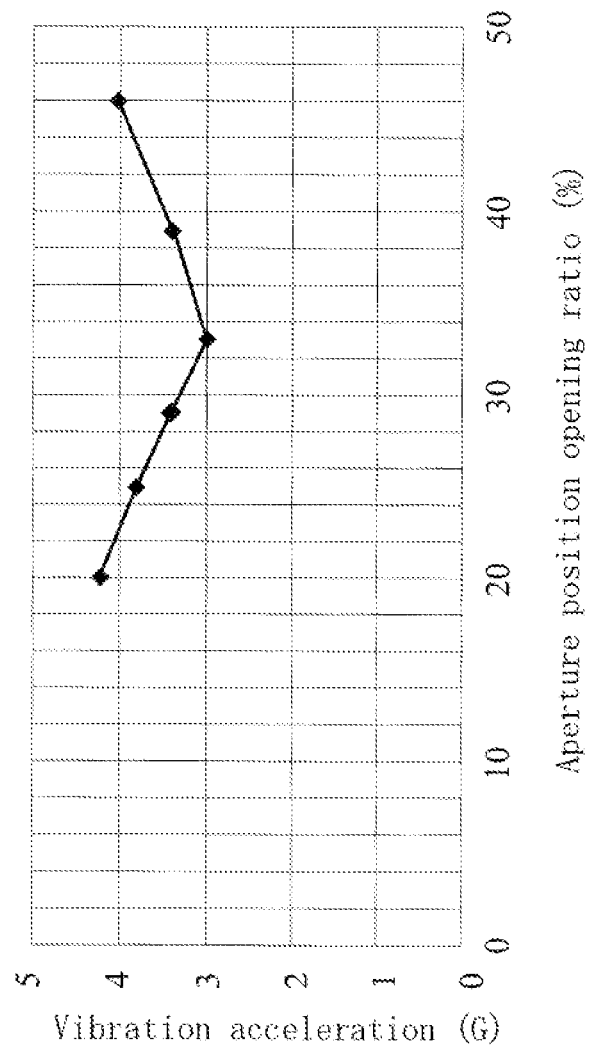
FIG. 20 is a graph showing the results of measurement for Examples 17 to 22.

As in Example 3, the minimum residence time within the buffer tube during the depressurizing operation of the double vacuum pump apparatus Y2 was measured for the buffer tube Z1 of the double vacuum pump apparatus Y2 in Examples 17 to 22, and all was 0.15 second. As a result of measuring the vibration acceleration applied to the shaft 61a of the on-off valve 61 in the open state during the depressurizing operation for the double vacuum pump apparatuses Y2, the maximum values were as follows: 4.2 G (Example 17), 3.8 G (Example 18), 3.4 G (Example 19), 3.0 G (Example 20), 3.3 G (Example 21), and 4.0 G (Example 22). The results of the measurement for Example 17 to 22 are shown in the table in FIG. 19, and also are indicated on the solid line on the graph in the FIG. 20. On the graph of FIG. 20, the horizontal axis represents the opening ratio of the orifice plate 74 (constricted portion) (%), and the vertical axis represents the vibration acceleration (G) of the shaft 61a of the on-off valve 61.

Evaluation

A comparison of Examples 3 to 22 and Comparative Example 3 indicates that the vibration acceleration applied to the shaft 61a of the on-off valve 61 is smaller in the gas purification system X1 (Examples 3 to 22) shown in FIG. 1, which was with the buffer tube Z1, than in the gas purification system X3 (Comparative Example 3) shown in FIG. 17, in which this buffer tube was not provided. Further, if the length of the buffer tube is the same, this vibration acceleration of the shaft 61a of the on-off valve 61 is smaller when the orifice plate 74 is provided (Examples 10 to 16), than when such orifice plate is not provided. Furthermore, in the double vacuum pump apparatus Y2 (Examples 3 to 8, 10 to 15), using the buffer tube Z1 within which the minimum residence time of excess gas is 0.15 second or more, the vibration acceleration applied to the shaft 61a of the on-off valve 61 can be made particularly small.

The invention claimed is:

1. A double vacuum pump apparatus comprising:
a first vacuum pump of a positive displacement-type including a suction port and a discharge port;
a second vacuum pump including a suction port and a discharge port and having a discharge capacity smaller than a discharge capacity of the first vacuum pump;
a connection line connecting between the discharge port of the first vacuum pump and the suction port of the second vacuum pump;
a bypass line having a first end connected to the connection line and a second end for emitting gas to outside; and
an on-off valve disposed in the bypass line between the first end and the second end thereof,
wherein the on-off valve is configured to be switched from an open state to a closed state when a discharge amount from the discharge port of the first vacuum pump has decreased to match the discharge capacity of the second vacuum pump.

2. The double vacuum pump apparatus according to claim 1,
further comprising a pressure detector that detects a pressure adjacent the suction port of the first vacuum pump,
wherein the on-off valve is configured to be switched from the open state to the closed state when the pressure detector has detected that the discharge amount from the discharge port of the first vacuum pump has decreased to a pressure value indicating that said discharge amount has matched the discharge capacity of the second vacuum pump.

3. The double vacuum pump apparatus according to claim 1,
further comprising a pressure detector that detects a pressure adjacent the suction port of the first vacuum pump,
wherein the on-off valve is configured to be switched from the open state to the closed state when the pressure detector has detected a pressure value indicating that a pressure inside the connection line has decreased to an atmospheric pressure.

4. The double vacuum pump apparatus according to claim 1,
wherein each of the first and second vacuum pumps is a roots pump including a casing and a rotor within the casing, and the rotor of the first vacuum pump and the rotor of the second vacuum pump are configured to be rotationally driven in conjunction with each other by a single motor.

5. The double vacuum pump apparatus according to claim 1,
wherein the bypass line comprises a buffer tube between the first end and the on-off valve for suppressing flow vibration of gas flowing into the bypass line.

6. The double vacuum pump apparatus according to claim 5,
wherein the buffer tube is configured such that, in the case where the on-off valve is in the open state, a minimum residence time within the buffer tube of gas passing therethrough is 0.15 second or more when the discharge amount from the discharge port of the first vacuum pump exceeds the discharge capacity of the second vacuum pump.

7. The double vacuum pump apparatus according to claim 5,
wherein the buffer tube includes a constricted portion for locally narrowing a flow path of gas passing in the buffer tube, and the constricted portion has an opening ratio of 20 to 46%.

8. The double vacuum pump apparatus according to claim 5,
wherein the buffer tube includes a plurality of constricted portions for locally narrowing a flow path of gas passing in the buffer tube, and the plurality of constricted portions include a first constricted portion located most upstream in the flow path and a second constricted portion located most downstream.

9. The double vacuum pump apparatus according to claim 7,
wherein the constricted portion is an orifice plate having an opening, or a baffle plate.

10. The double vacuum pump apparatus according to claim 7,
wherein the constricted portion is an orifice plate having an opening, and a portion of an edge of the opening is flush with an inner wall surface of the buffer tube.

11. The double vacuum pump apparatus according to claim 5,
wherein the buffer tube is configured such that, in the case where the on-off valve is in the open state, a maximum flow velocity within the buffer tube of gas passing therethrough is 6 to 12 m/sec when the amount of gas discharged from the discharge port of the first vacuum pump exceeds the suction capacity of the second vacuum pump.

12. The double vacuum pump apparatus according to claim 5,
wherein the buffer tube includes a first end wall on the first end side in the bypass line, a second end wall on the second end side, and a surrounding wall extending between the first and second end walls, and
the bypass line includes a connecting tube portion connected to the buffer tube at a location of the surrounding wall on the first end wall side for introducing gas to the buffer tube, and the connecting tube portion extends in a direction intersecting with an extending direction of the surrounding wall.

13. The double vacuum pump apparatus according to claim 5,
wherein the buffer tube includes a first end wall on the first end side in the bypass line, a second end wall on the second end side, and a surrounding wall extending between the first and second end walls, and
the bypass line includes a connecting tube portion connected to the buffer tube at the first end wall for introducing gas to the buffer tube, and the connecting tube portion has a bent structure for bending the flow of gas immediately before the gas is introduced into the buffer tube.

14. A gas purification system comprising:
an adsorption tower having an interior filled with an adsorbent, for purifying gas by pressure swing adsorption; and
a double vacuum pump apparatus according to claim 1, for depressurizing the interior of the adsorption tower.

15. An exhaust gas vibration suppressing device comprising:
a first vacuum pump of a positive displacement-type including a suction port and a discharge port;
a second vacuum pump including a suction port and a discharge port and having a discharge capacity smaller than a discharge capacity of the first vacuum pump;
a connection line connecting between the discharge port of the first vacuum pump and the suction port of the second vacuum pump;
a bypass line having a first end connected to the connection line and a second end for emitting gas to outside;
an on-off valve disposed between the first end and the second end of the bypass line; and
a buffer tube provided between the first end and the on-off valve for suppressing flow vibration of gas flowing into the bypass line.

16. The exhaust gas vibration suppressing device according to claim 15,
wherein the buffer tube is configured such that, in the case where the on-off valve is in the open state, a minimum residence time within the buffer tube of gas passing therethrough is 0.15 second or more when the discharge amount from the discharge port of the first vacuum pump exceeds the discharge capacity of the second vacuum pump.

17. The exhaust gas vibration suppressing device claim 15,
wherein the buffer tube includes a constricted portion for locally narrowing a flow path of gas passing in the buffer tube, and the constricted portion has an opening ratio of 20 to 46%.

* * * * *